(12) United States Patent
Burnstad

(10) Patent No.: US 7,333,392 B2
(45) Date of Patent: Feb. 19, 2008

(54) METHOD FOR ESTIMATING AND RECONSTRUCTING SEISMIC REFLECTION SIGNALS

(75) Inventor: Roy Matthew Burnstad, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 11/231,061

(22) Filed: Sep. 19, 2005

(65) Prior Publication Data

US 2007/0064535 A1 Mar. 22, 2007

(51) Int. Cl.
*G01V 1/38* (2006.01)
(52) U.S. Cl. ...................................... 367/21
(58) Field of Classification Search ............... 367/21
See application file for complete search history.

(56) References Cited

U.S. PATENT DOCUMENTS

| | | | | |
|---|---|---|---|---|
| 4,905,204 A * | 2/1990 | Hughes | ........................ | 367/62 |
| 4,910,716 A | 3/1990 | Kirlin et al. | ................... | 367/24 |
| 5,047,991 A * | 9/1991 | Hsu | ........................... | 367/25 |
| 5,381,092 A * | 1/1995 | Freedman | ................... | 324/303 |
| 5,455,806 A | 10/1995 | Hutson | ........................ | 367/100 |
| 5,560,367 A | 10/1996 | Haardt et al. | | |
| 5,892,732 A | 4/1999 | Gersztenkorn | ............... | 367/72 |
| 6,141,622 A * | 10/2000 | Keller et al. | ................... | 702/16 |
| 6,370,477 B1 * | 4/2002 | Vermeer | ...................... | 702/14 |
| 6,516,274 B2 * | 2/2003 | Cheng et al. | ................. | 702/14 |
| 6,651,006 B1 * | 11/2003 | Trappe et al. | ................. | 702/14 |
| 6,651,007 B2 * | 11/2003 | Ozbek | ......................... | 702/17 |
| 6,868,341 B2 * | 3/2005 | Valero | ......................... | 702/11 |
| 6,895,366 B2 * | 5/2005 | Izuoka et al. | ............... | 702/185 |
| 6,950,751 B2 * | 9/2005 | Knobloch | .................... | 702/16 |
| 7,149,630 B2 * | 12/2006 | Abma | ......................... | 702/17 |
| 2006/0155477 A1 * | 7/2006 | Matson et al. | ................ | 702/14 |
| 2006/0200034 A1 * | 9/2006 | Ricci et al. | ................. | 600/513 |

OTHER PUBLICATIONS

Strelitz et al. Integral Transforms, Data Compression, and Automatic Analysis of Seismic Sections. IEEE Transactions of Geoscience and Remote Sensing, vol. 28, No. 6, Nov. 1990.□□*
Bansal et al. Diffraction enhancement in prestack seismic data. Geophysics vol. 70, No. 3 (May-Jun. 2005).*

(Continued)

*Primary Examiner*—Deandra M Hughes
(74) *Attorney, Agent, or Firm*—Abelman, Frayne & Schwab

(57) ABSTRACT

A method for reconstructing seismic data signals of poor quality to improve the signal-to-noise ratio of the data for display and analysis in connection with the selection of drilling sites for recovery of hydrocarbons. The method includes providing a signal model by applying a Karhunen-Loeve transform to selected input seismic data collected for the target zone, to form a co-variance matrix from the dot products of all pairs of input data. Eigenvalues and eigenvectors for the matrix are computed, and the most significant eigenvectors are inversely transformed to provide a coherent estimate of the signal. The input data is combined with the model data based on the determination that the model data lacks continuity, wherein the good quality signal-to-noise ratio data experiences little change and discontinuous data is enhanced by a contribution of the signal estimate data. The reconstructed seismic data of the target zone can be displayed for analysis.

22 Claims, 21 Drawing Sheets

OTHER PUBLICATIONS

Castrillon-Canadas et al. Fast Estimation of Continuous Karhunen-Loeve Eigenfunctions Using Wavelets. IEEE Transactions on Signal Processing. vol. 50. No. 1. Jan. 2002.*

Kamal M. Al-Yahya; published in 1991; Application of the Partial Karhunen-Loeve Transform to Suppress Random Noise in Seismic Sections.

* cited by examiner

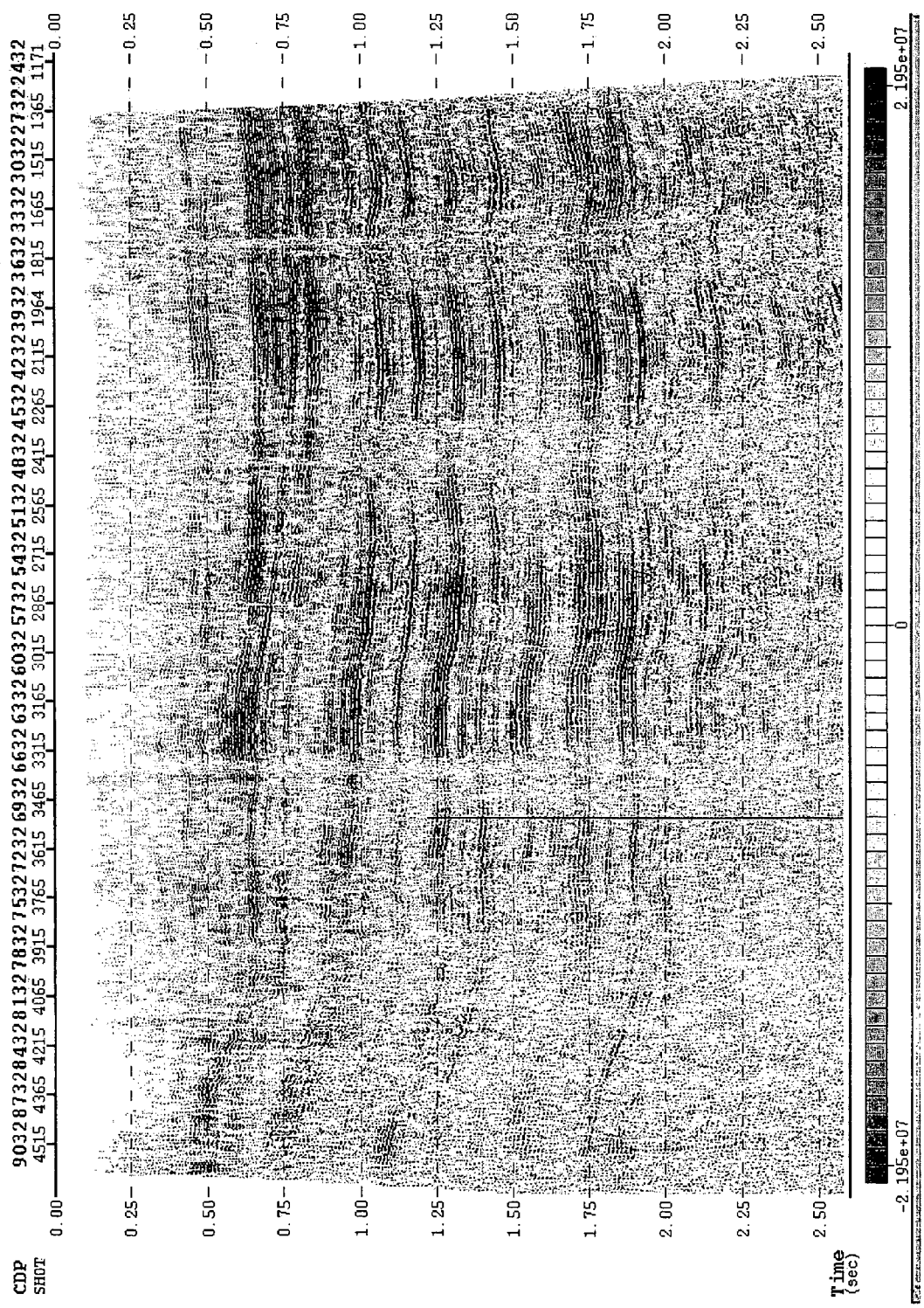
Figure 2. 2D seismic section with noise problems. Time scale in seconds.

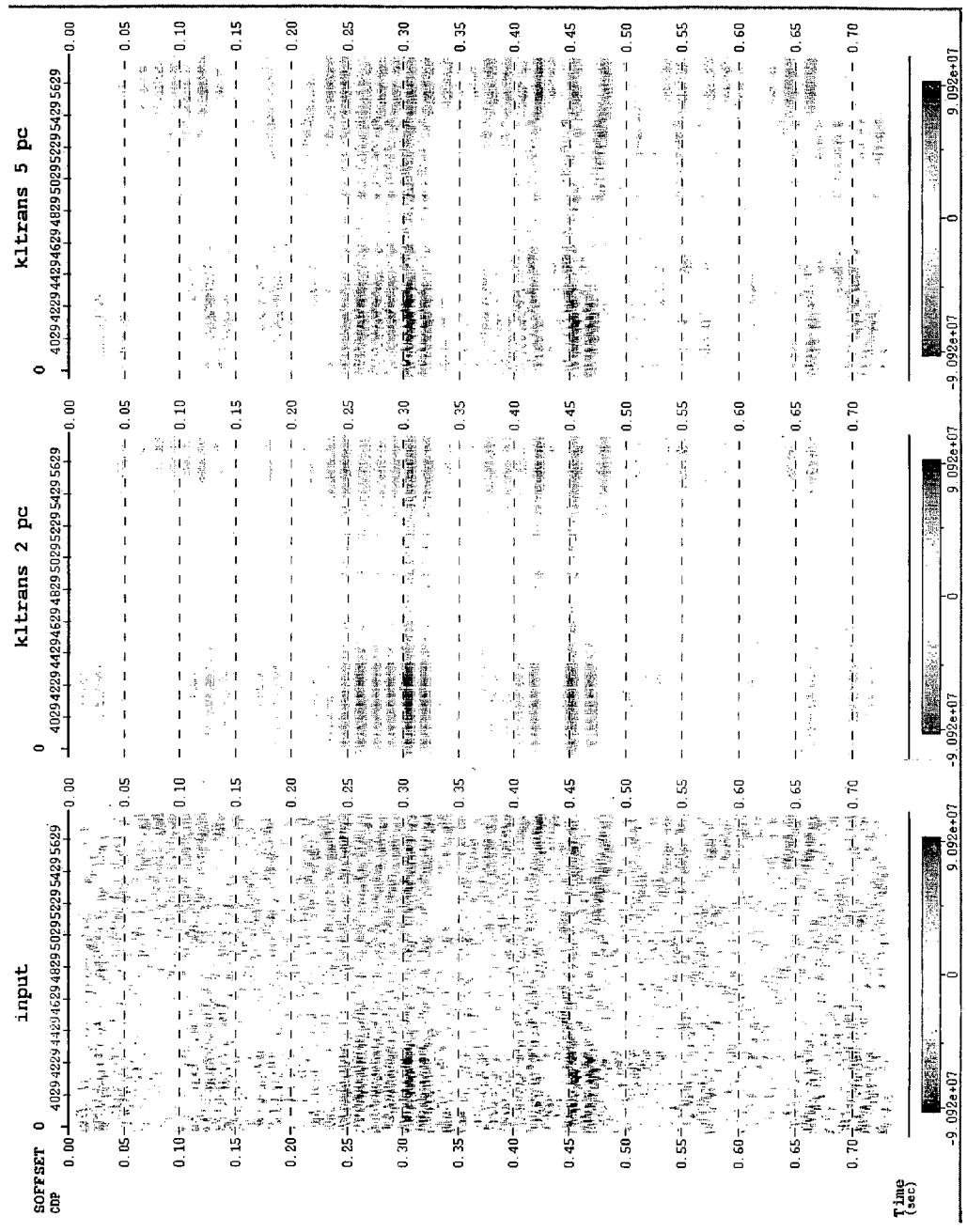
Figure 3. KL transform example; input section (left), 2 principal components (middle), 5 principal components (right)

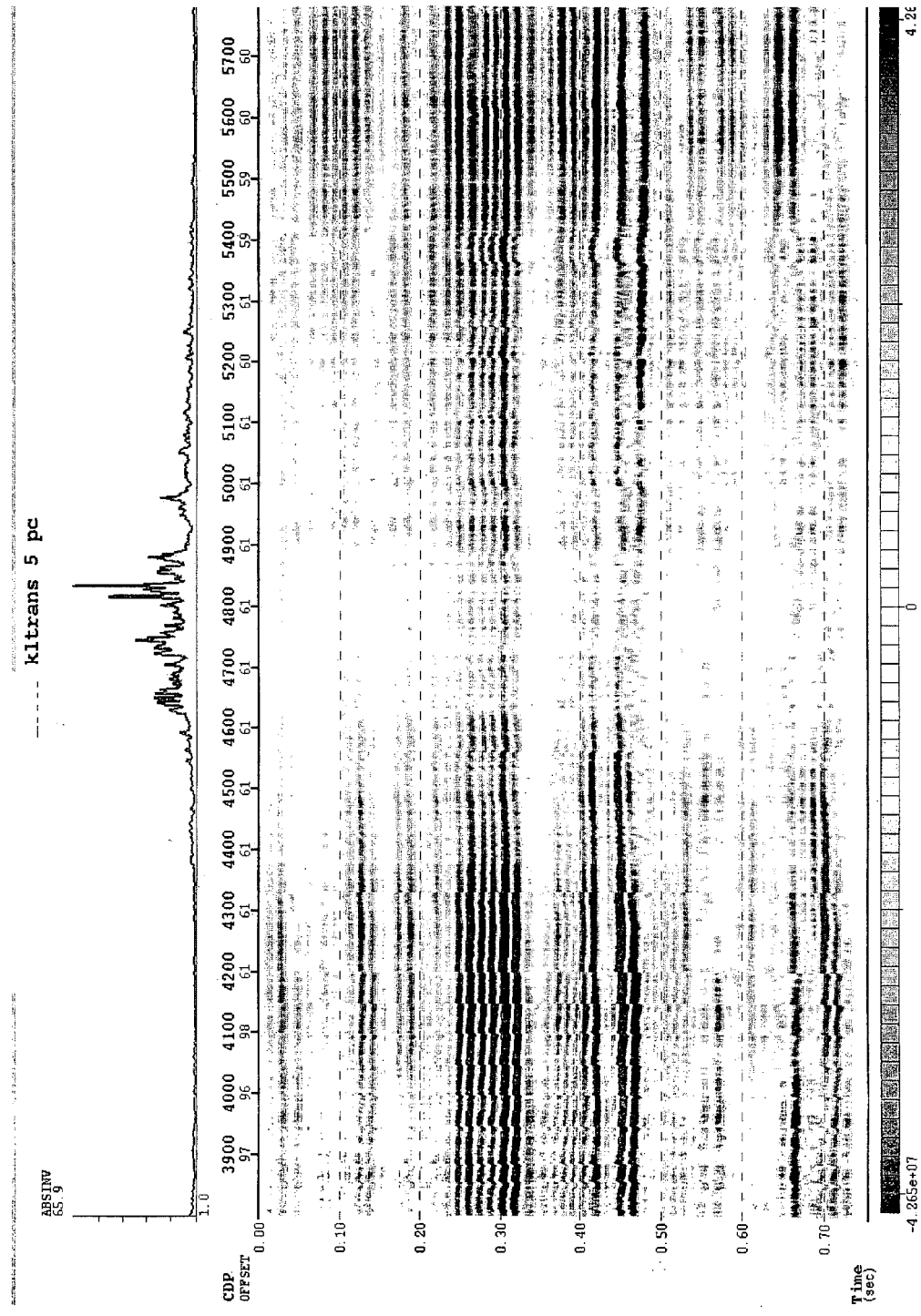
Figure 4. KL transform of flattened input section using 5 principal components (computed scalars graphed above).

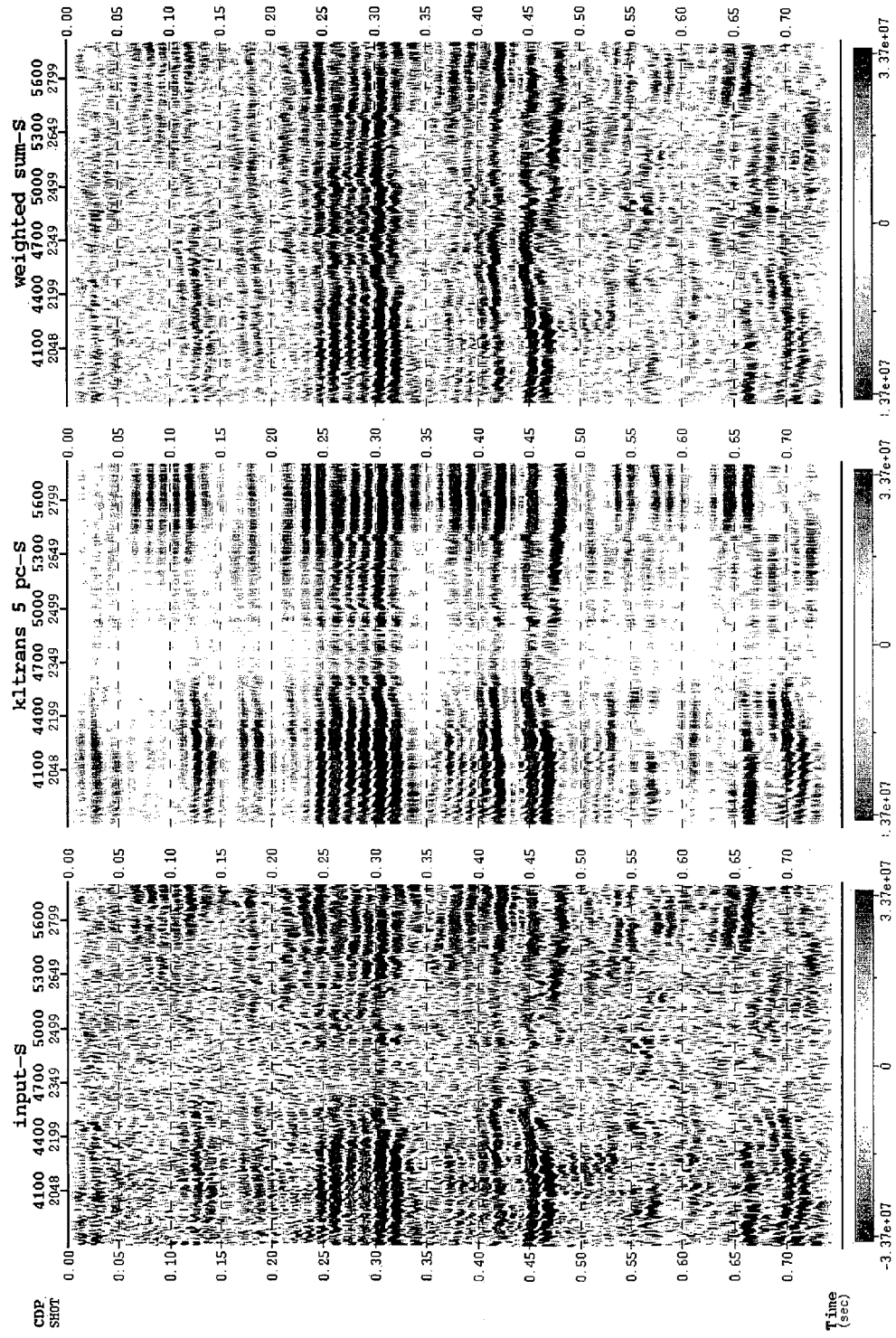
Figure 5. 2D seismic example, with flattening statics applied; input (left), estimated signal model (middle), output PEAR section (right)

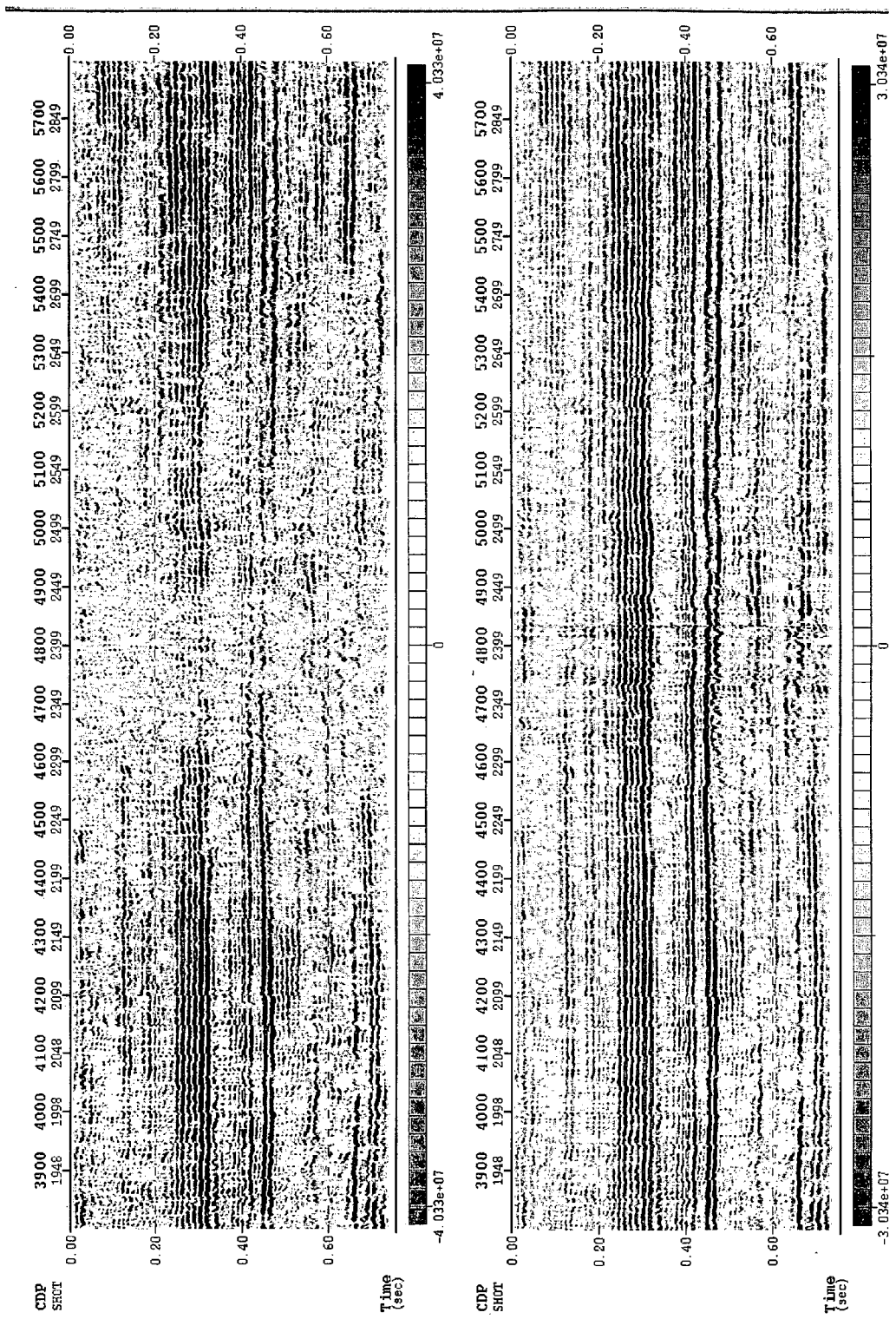
Figure 6. 2D seismic example with flattening statics applied; input (top), output PEAR section (bottom)

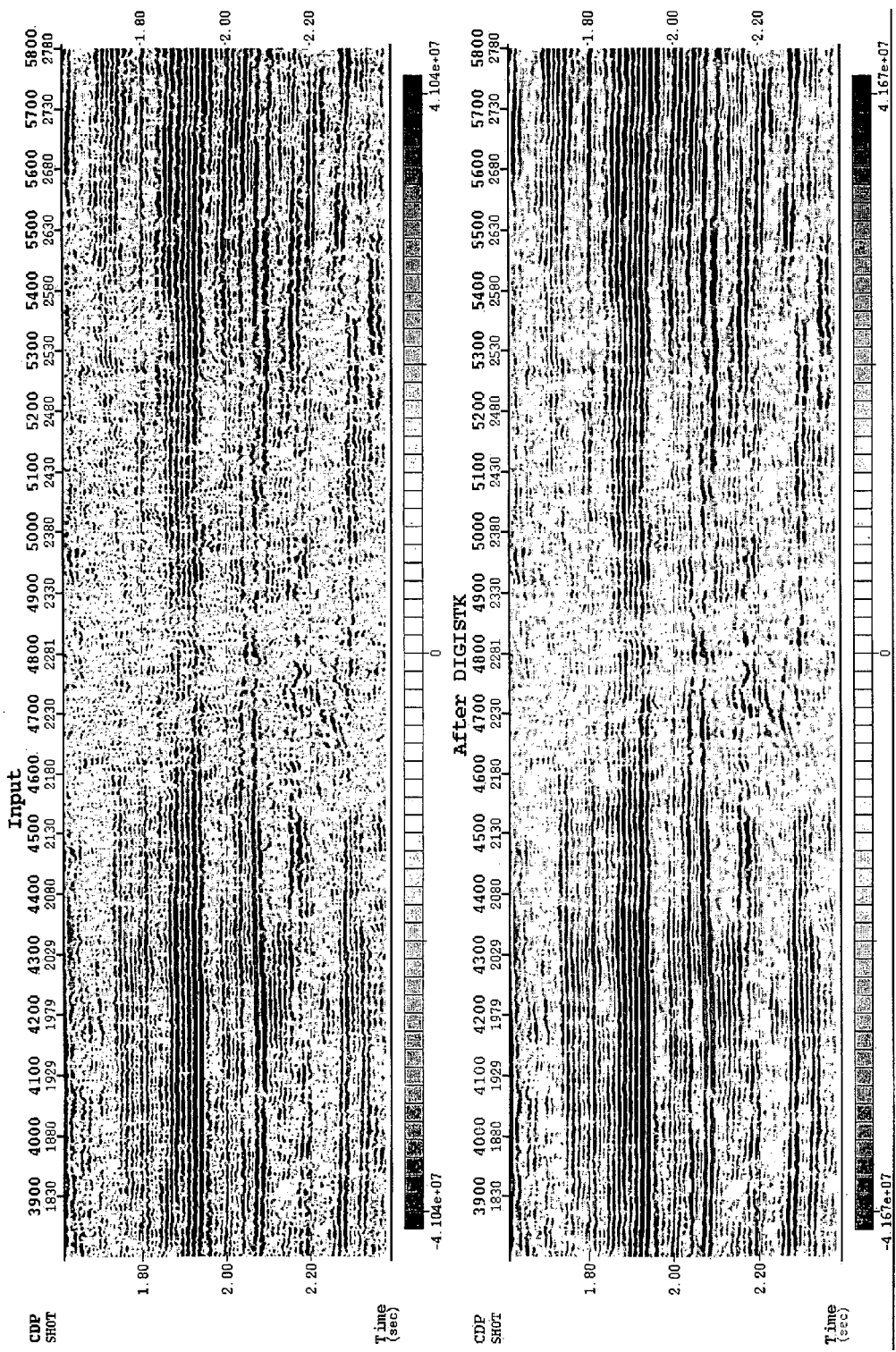
Figure 7. Previous method example, Dip Weight and Sum; input (top), output section (bottom)

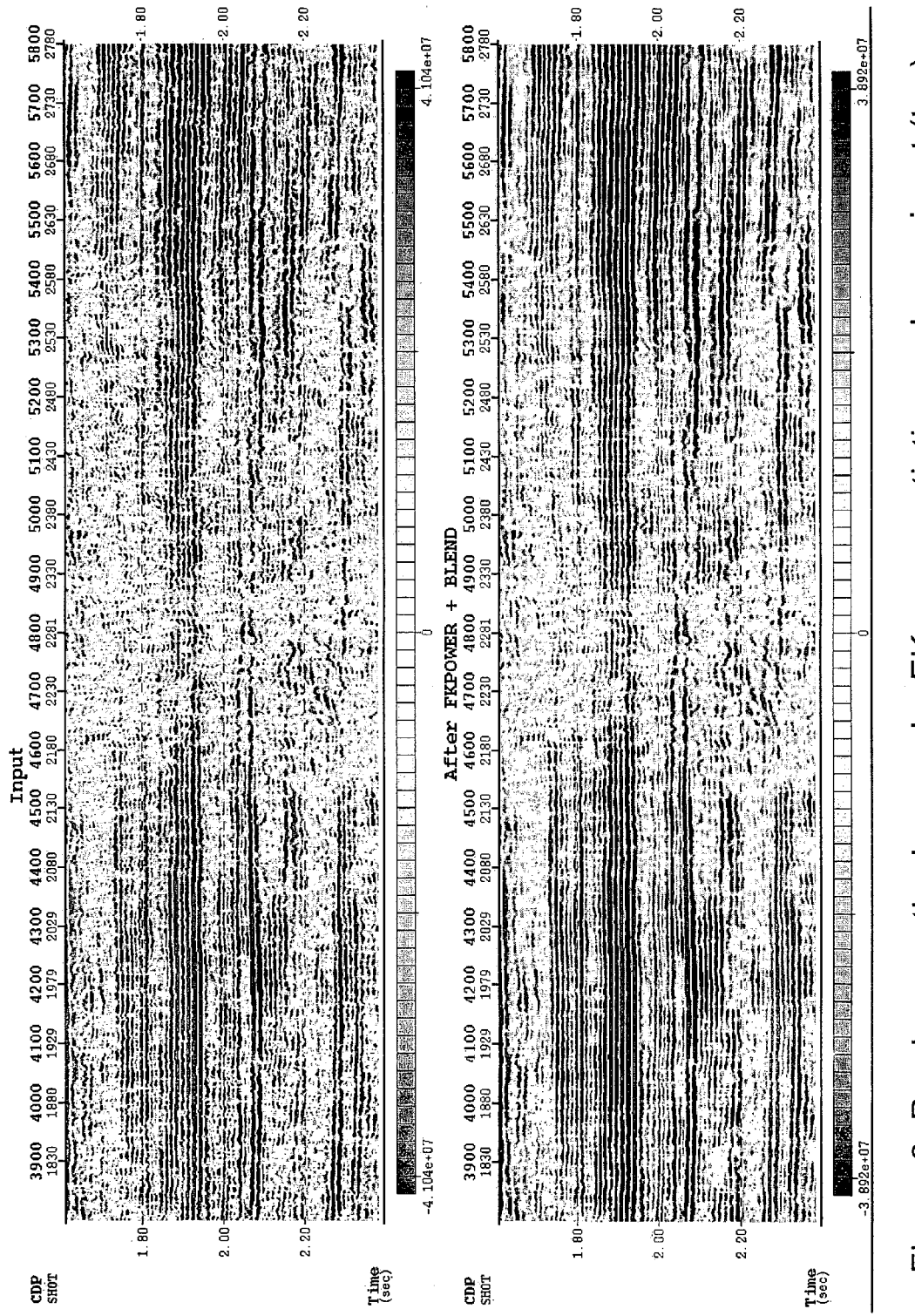
Figure 8. Previous method example, FK exponentiation and sum; input (top), output section (bottom)

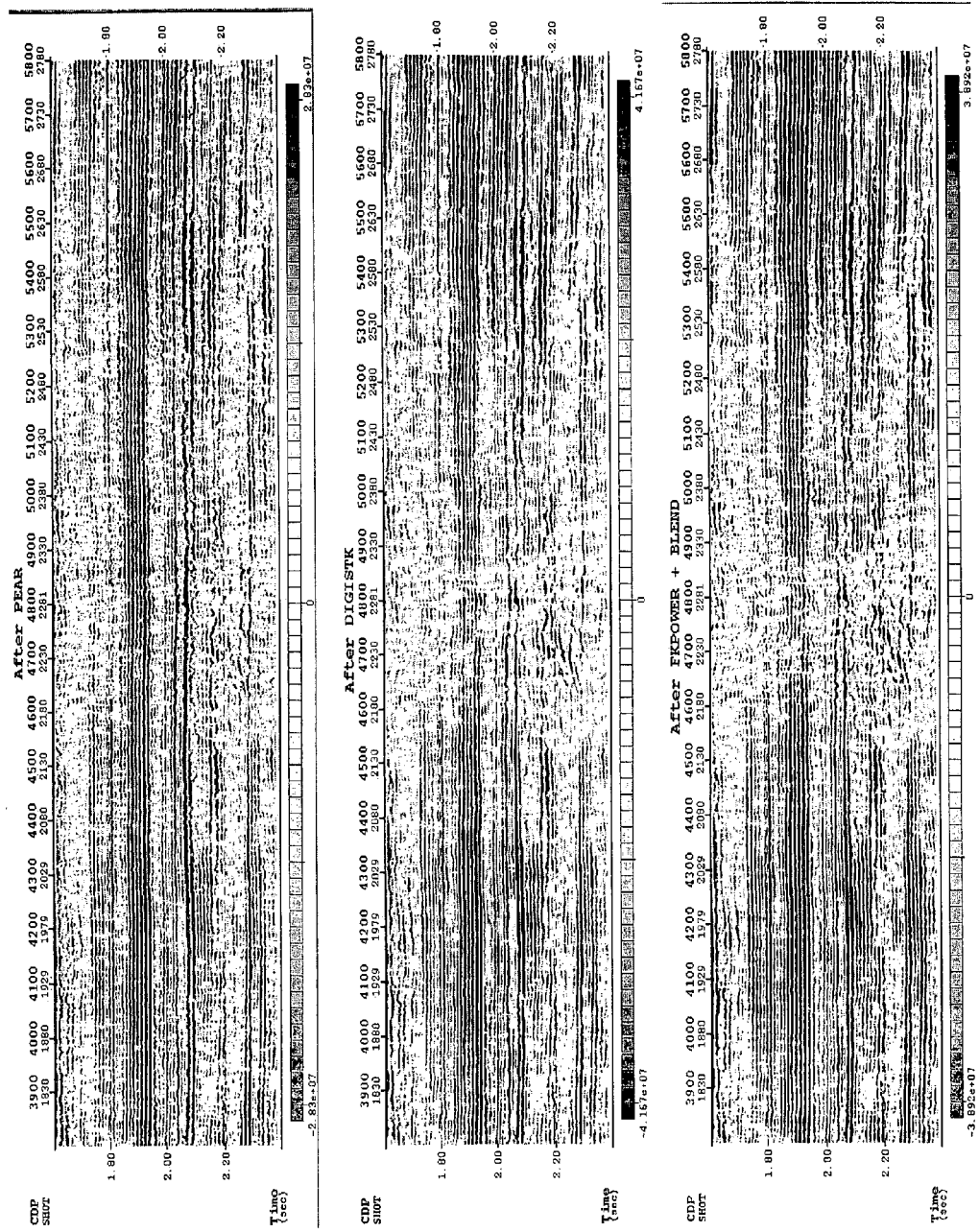
Figure 9. Comparison of methods; PEAR (top), Dip Weight (middle), FK Exponentiation (bottom)

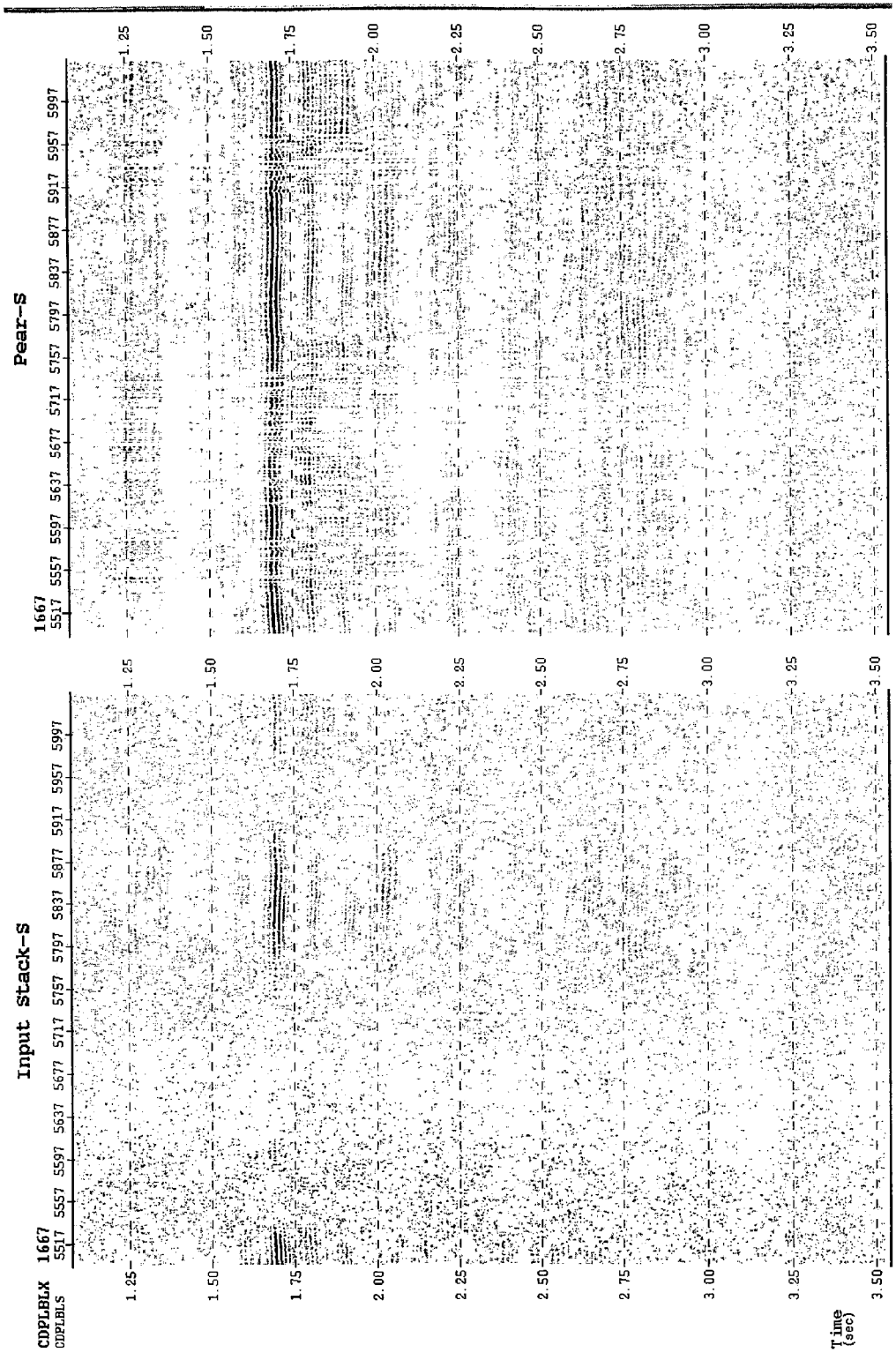
Figure 10. 3D seismic example number one, vertical view, crossline 1667; input (left), PEAR output (right)

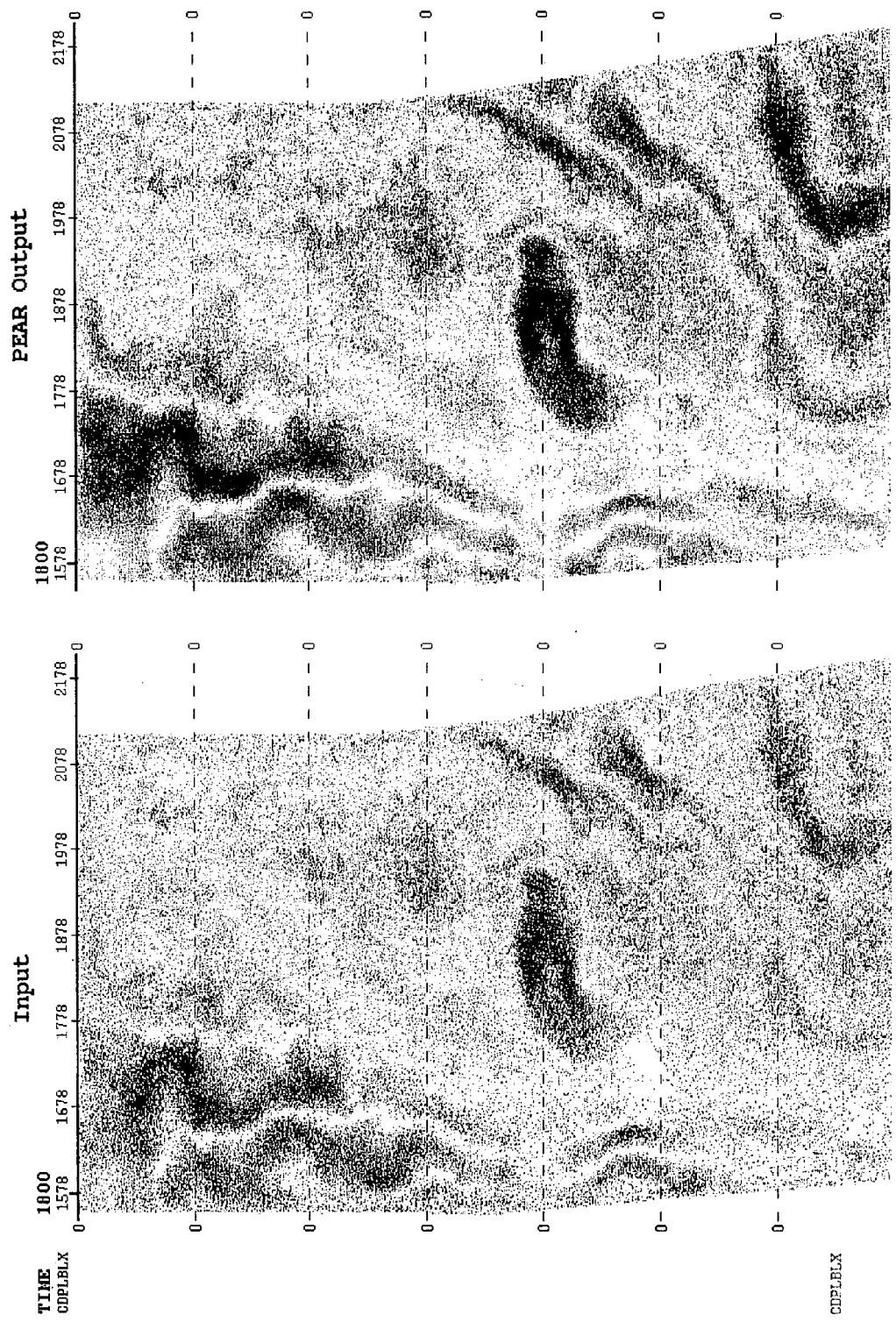
Figure 11. 3D seismic example number one, horizontal view, time slice 1800 milliseconds; input (left), PEAR output (right)

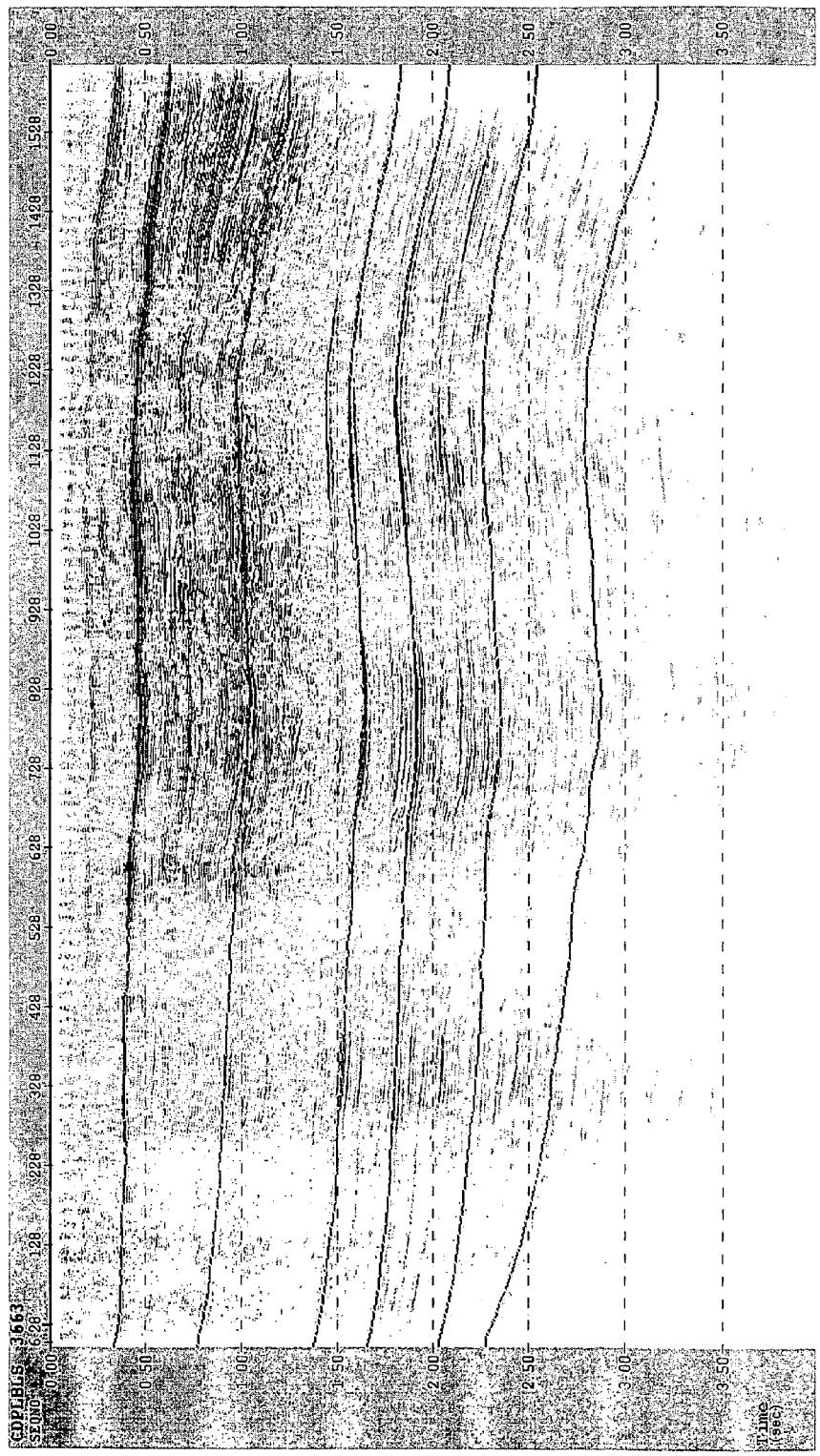
Figure 12. 3D seismic example number two, vertical view, subline 3663. Control horizons are plotted for reference. Time scale in seconds.

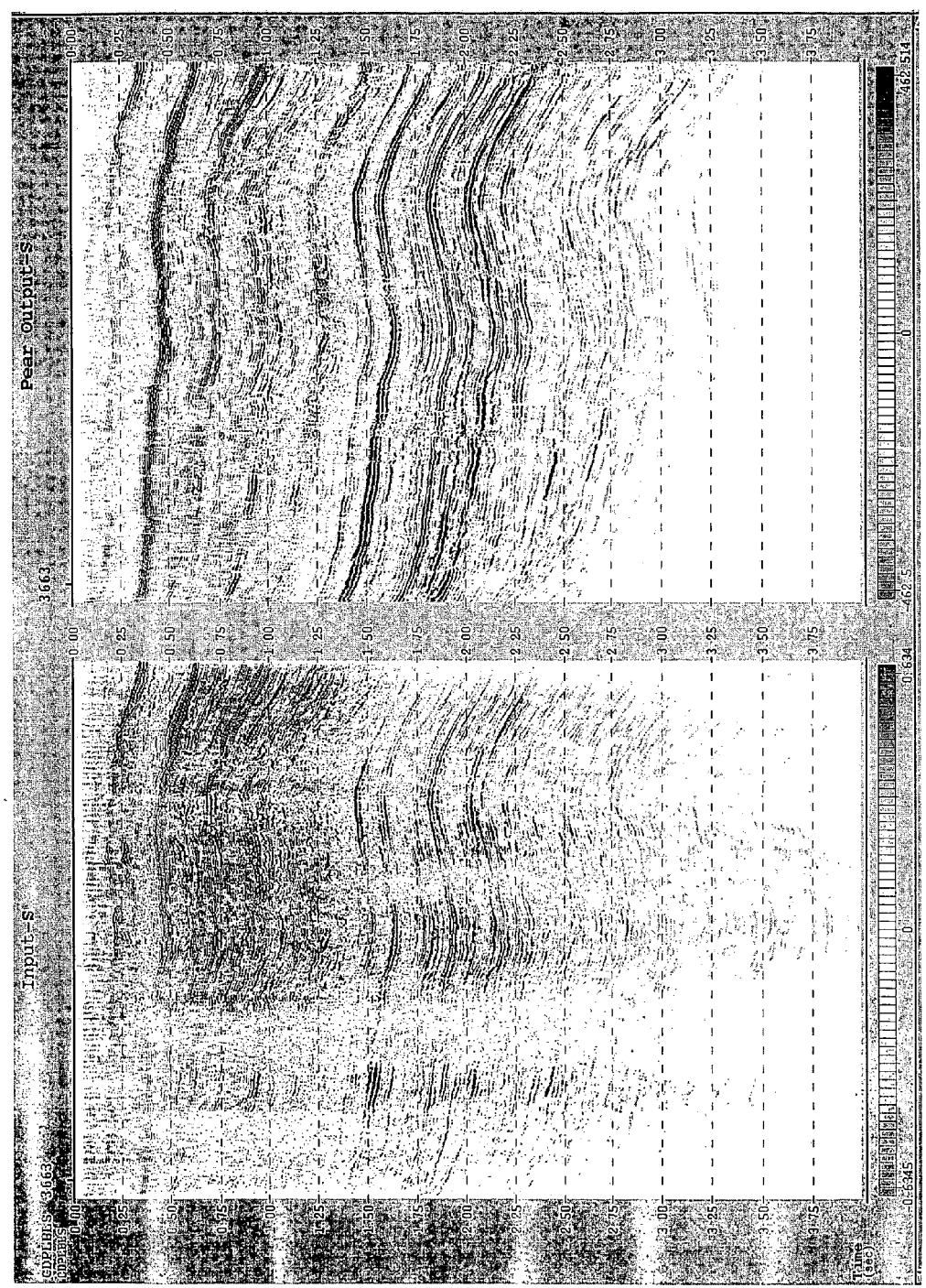
Figure 13. 3D seismic example number two, vertical view, subline 3663; input (left), PEAR output (right)

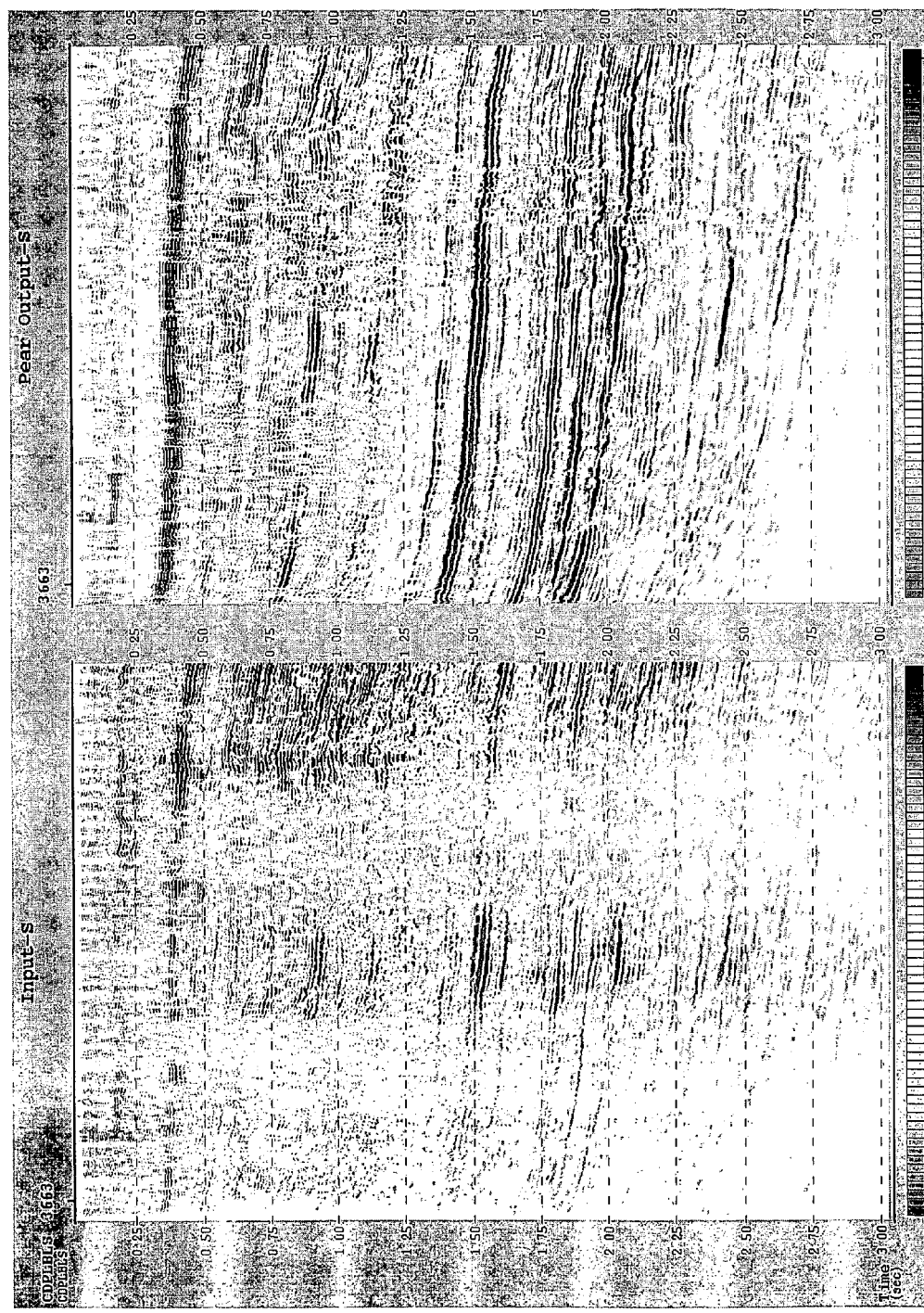
Figure 14. 3D seismic example number two, zoomed vertical view, subline 3663; input (left), PEAR output (right)

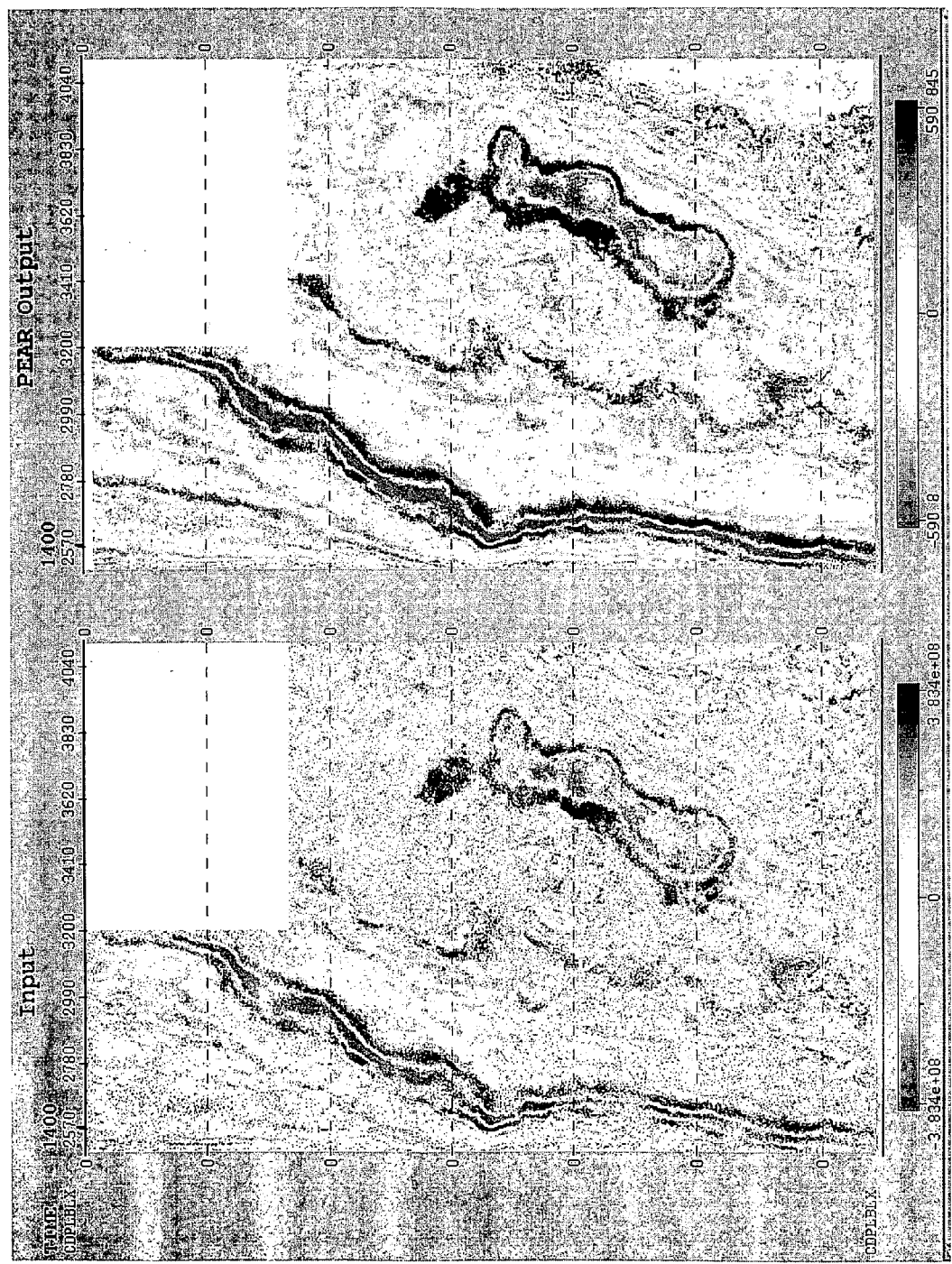
Figure 15. 3D seismic example number two, horizontal view, time slice 1400 milliseconds; input (left), PEAR output (right)

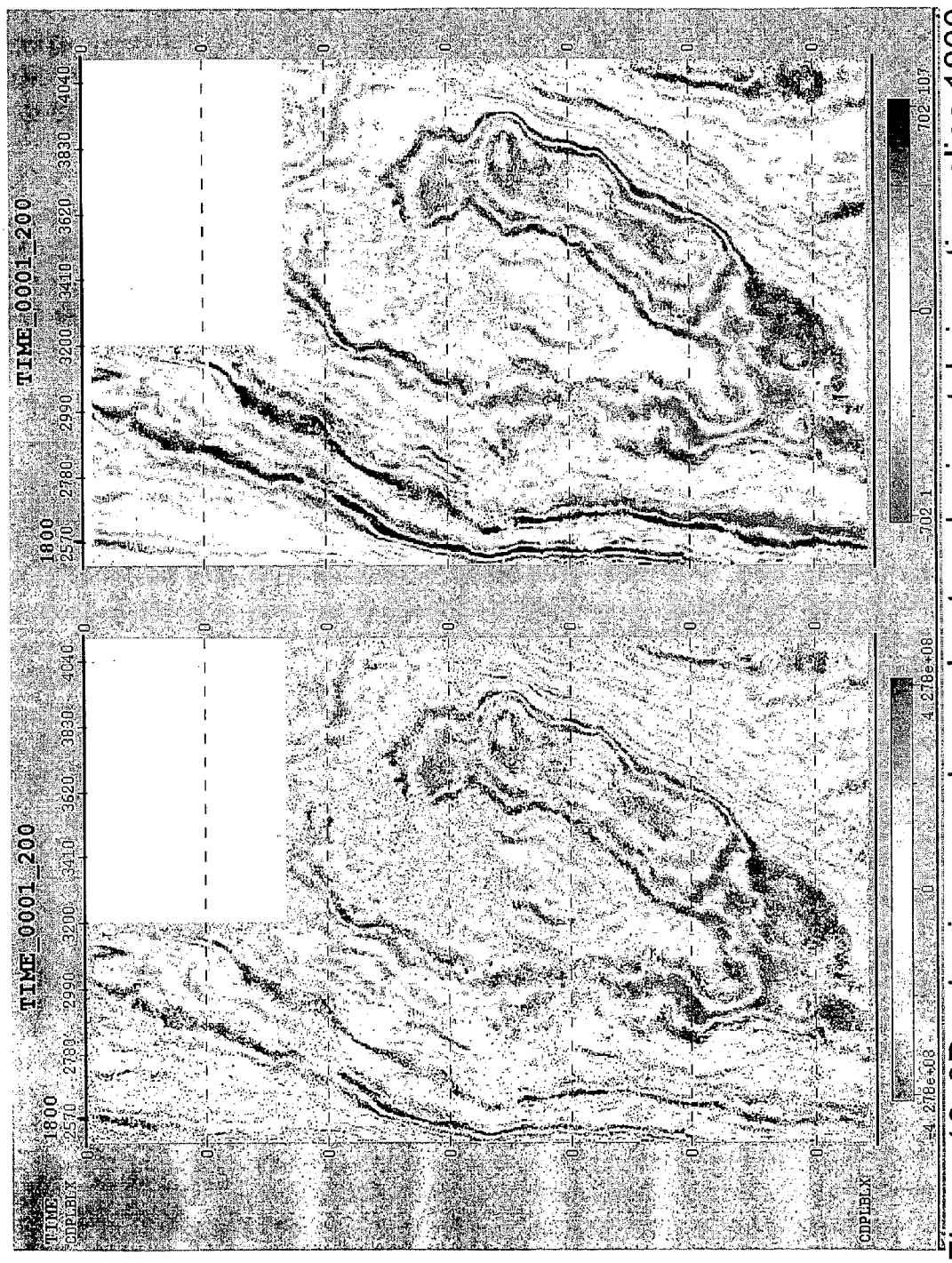
Figure 16. 3D seismic example number two, horizontal view, time slice 1800 milliseconds; input (left), PEAR output (right)

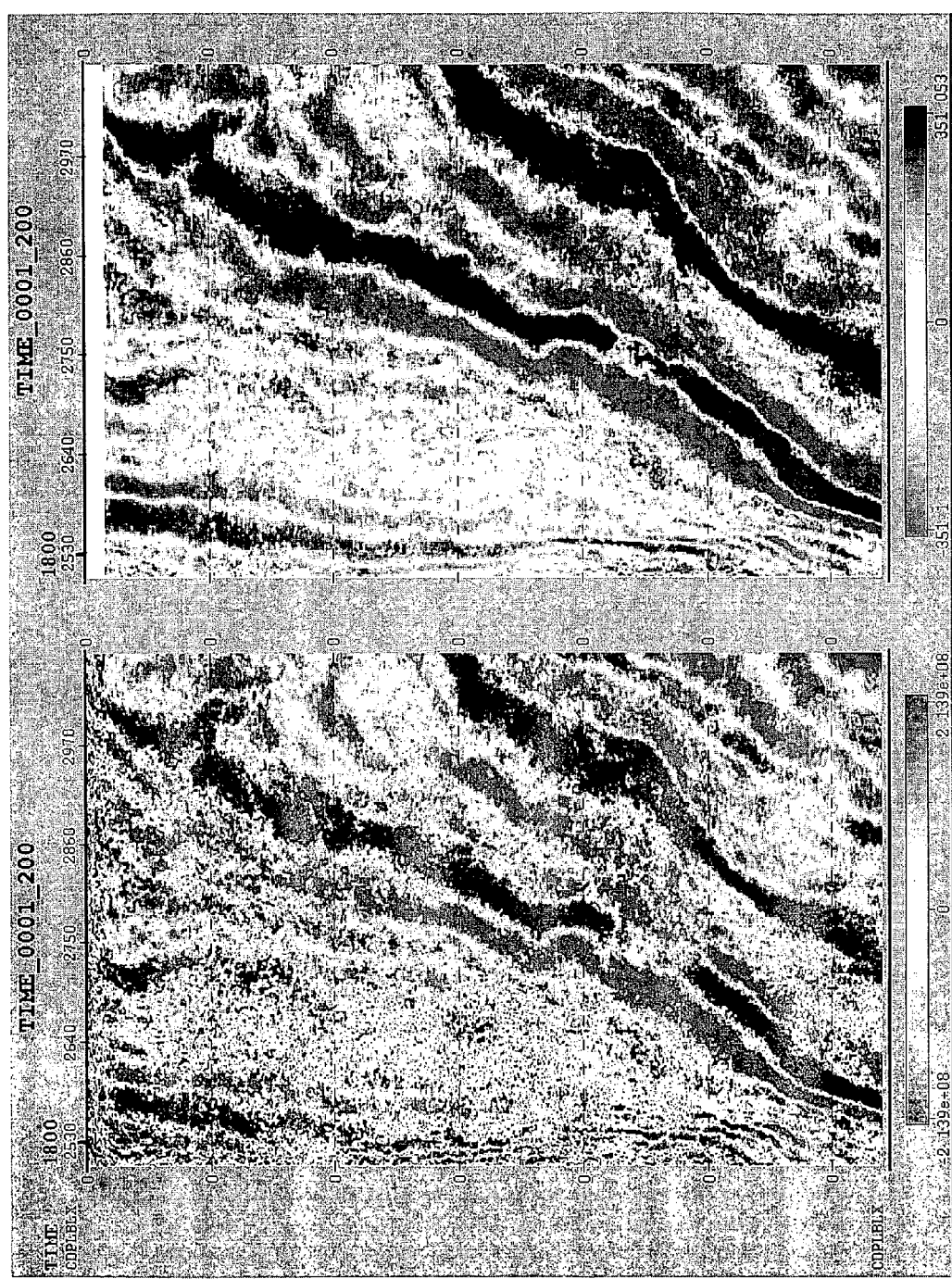
Figure 17. 3D seismic example number two, zoomed horizontal view, time slice 1800 milliseconds; input (left), PEAR output (right)

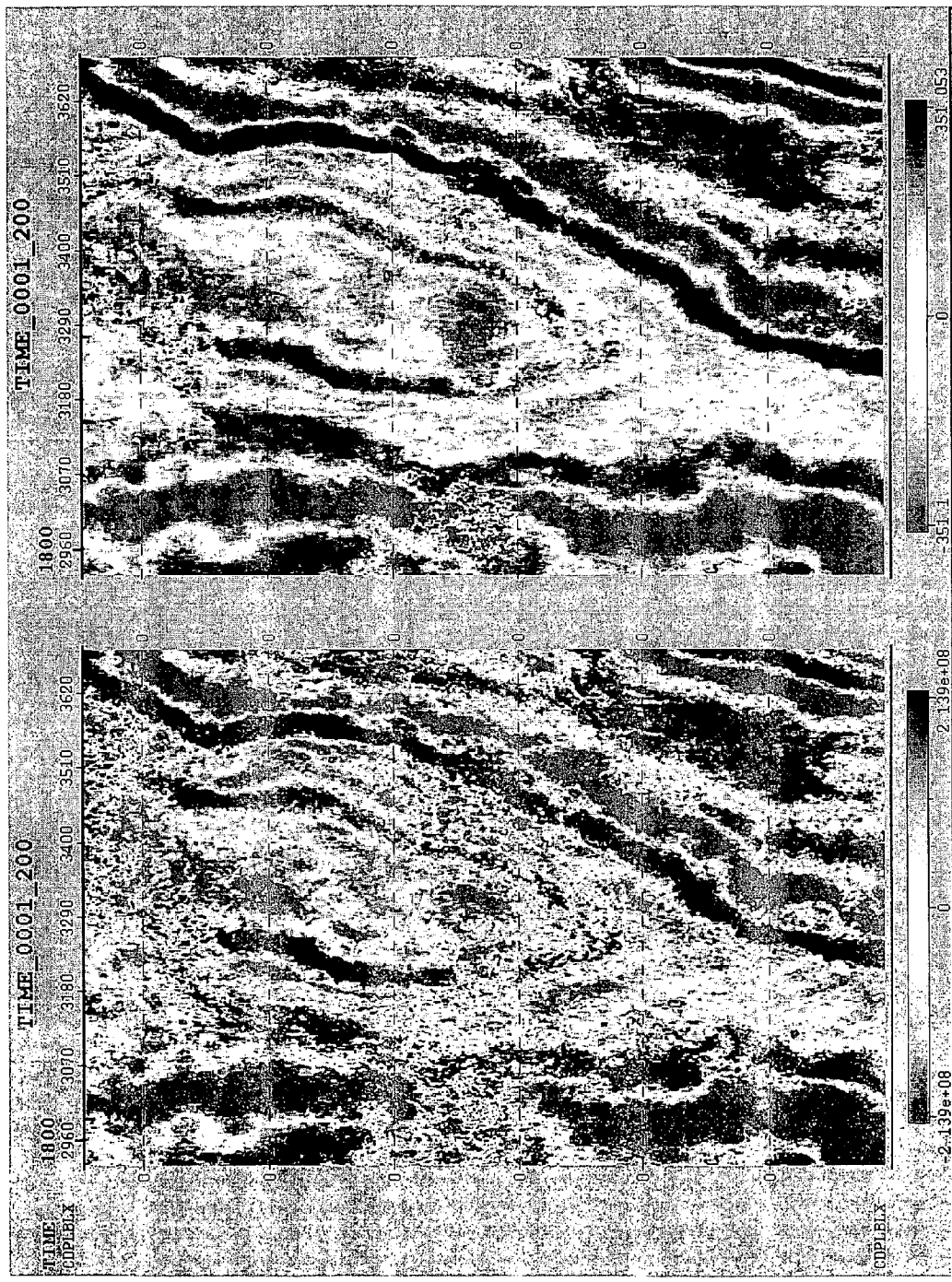
Figure 18. 3D seismic example number two, zoomed horizontal view, time slice 1800 milliseconds; input (left), PEAR output (right)

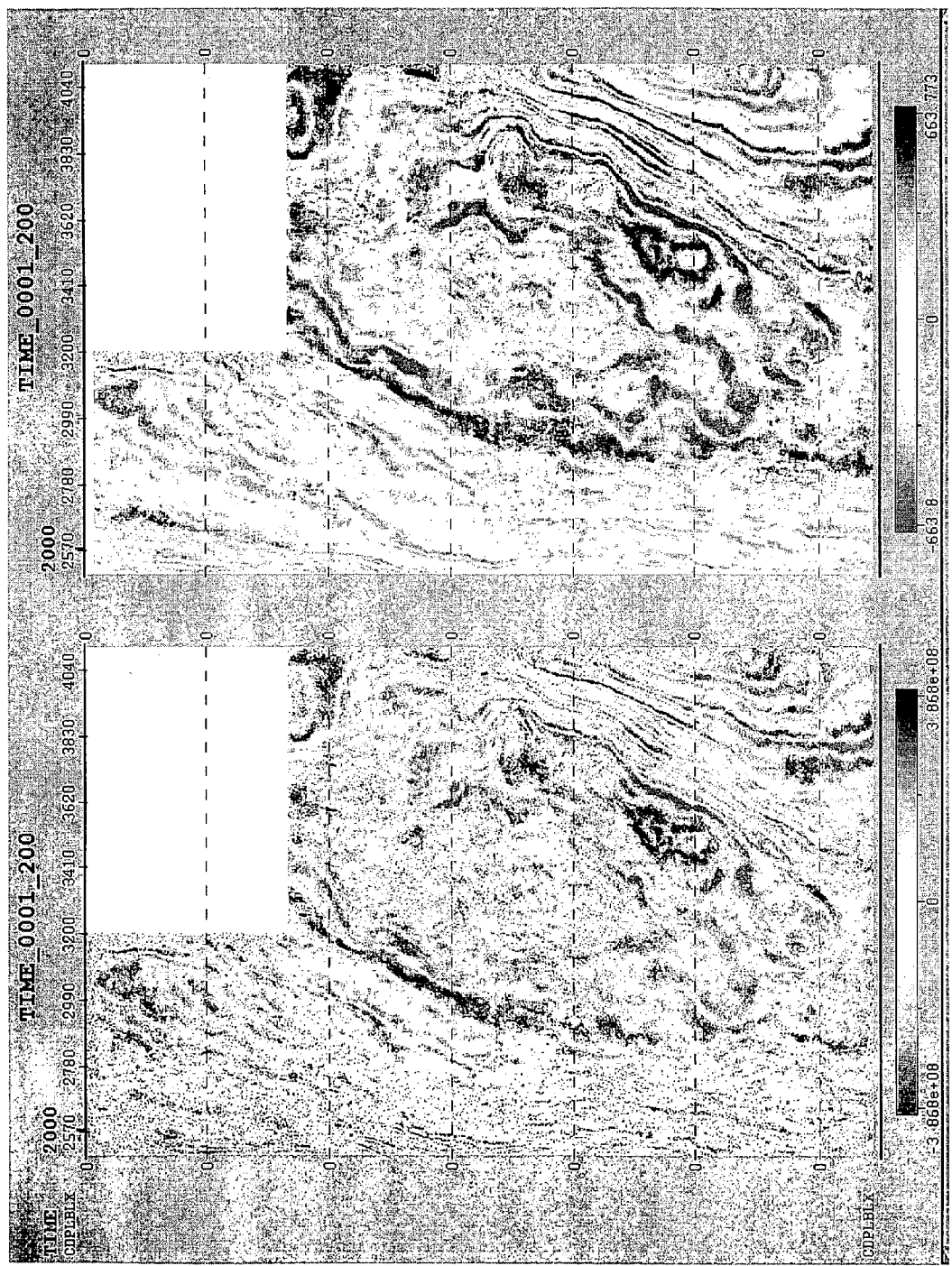
Figure 19. 3D seismic example number two, horizontal view, time slice 2000 milliseconds; input (left), PEAR output (right)

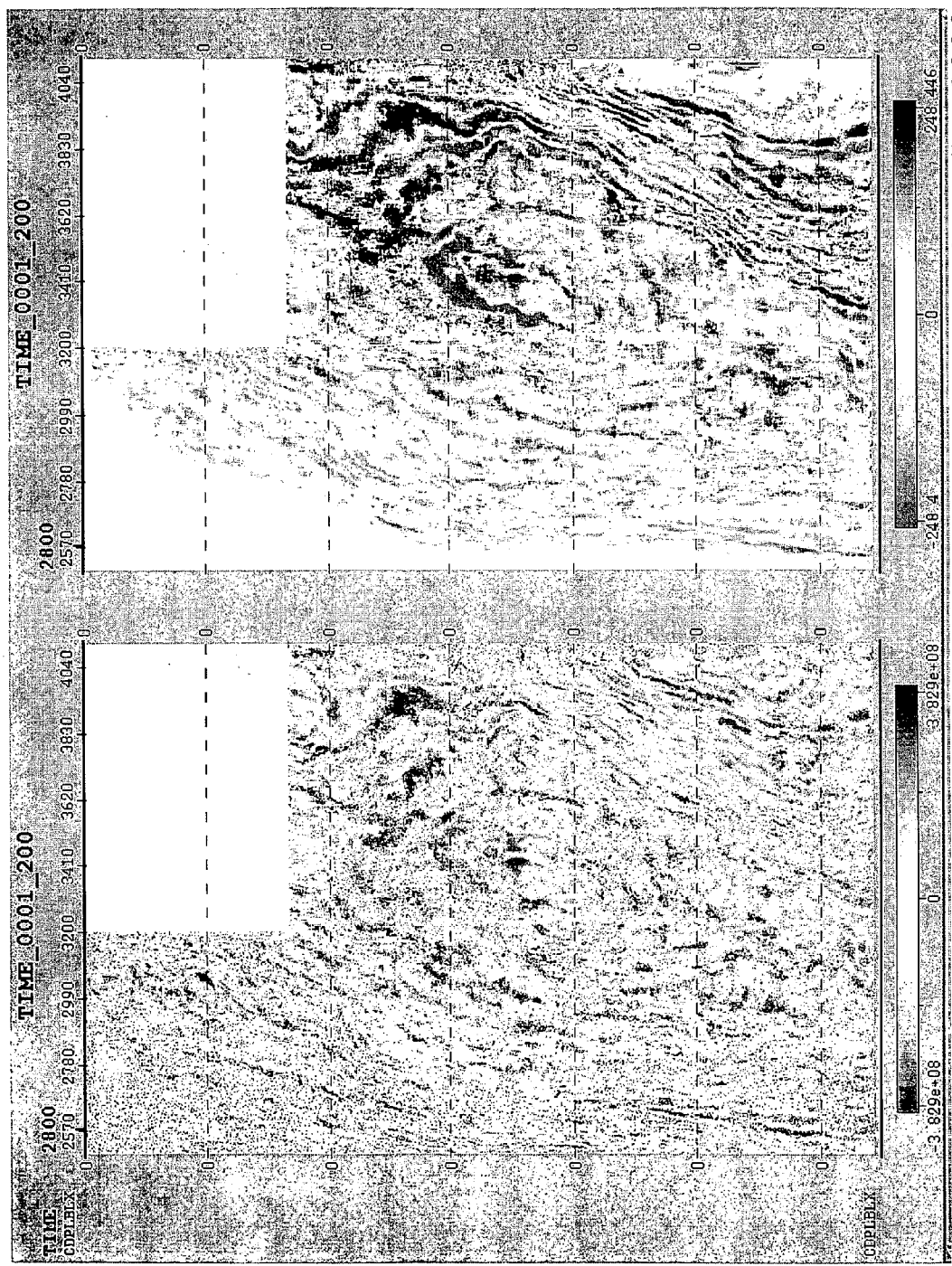
Figure 20. 3D seismic example number two, horizontal view, time slice 2800 milliseconds; input (left), PEAR output (right)

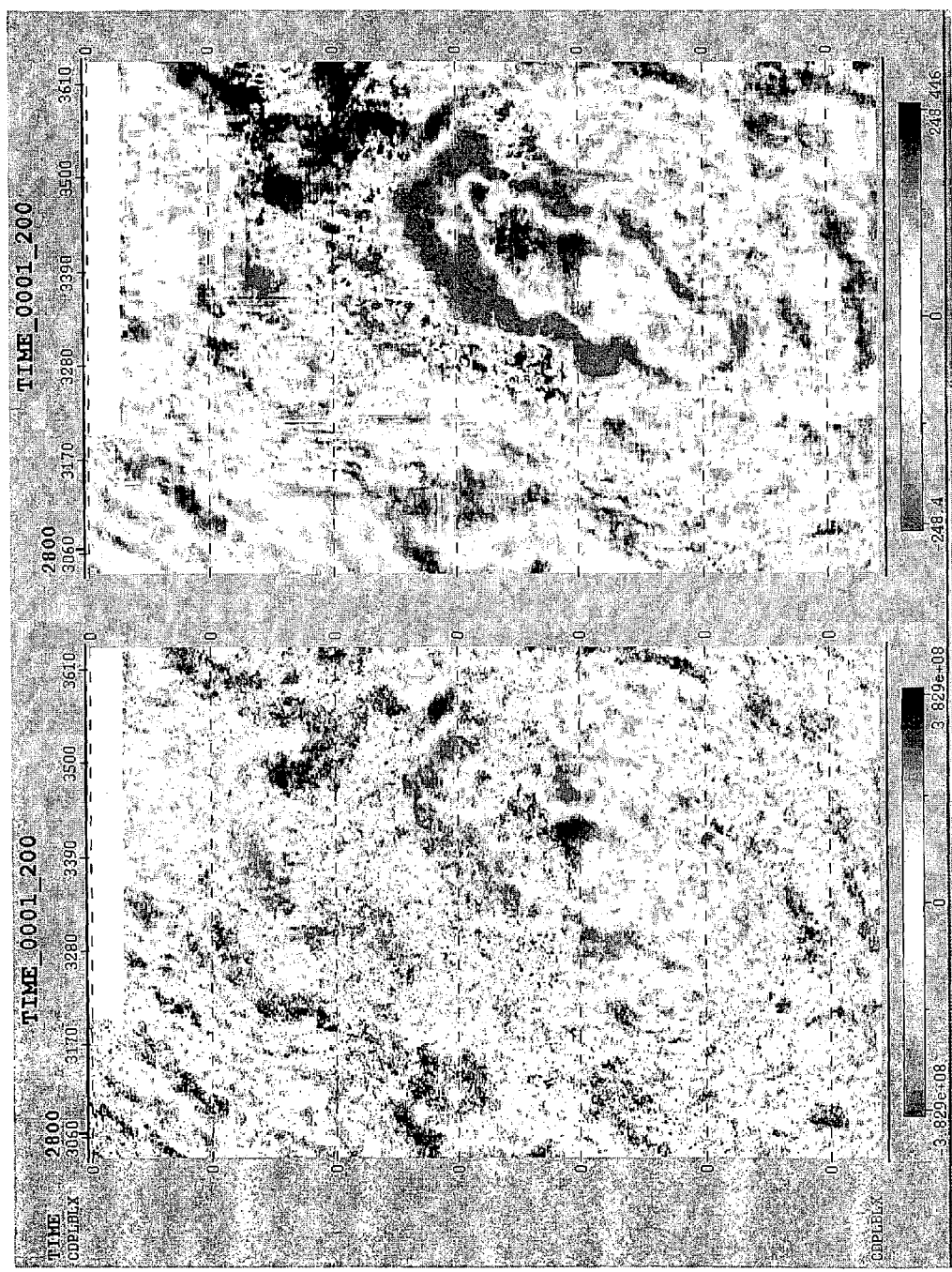
Figure 21. 3D seismic example number two, zoomed horizontal view, time slice 2800 milliseconds; input (left), PEAR output (right)

METHOD FOR ESTIMATING AND RECONSTRUCTING SEISMIC REFLECTION SIGNALS

FIELD OF THE INVENTION

The invention is directed to a seismic data processing method for the reconstruction of poor signals in surface seismic data.

BACKGROUND OF THE INVENTION

Seismic reflection data is used by geologists to locate optimum sites to drill for oil or gas. Raw surface seismic data collected by field crews is not immediately useful to the geologist. To improve the resolution of the data and compress it into a manageable form, seismic data processing is performed by geophysicists for the purpose of maximizing signal levels in the data while reducing noise levels. This processing is referred to as improving the signal-to-noise (S/N) ratio of the data. Data processing is a critical step in providing useful data with an improved S/N ratio to geologists whose task it is to interpret the processed seismic data for the sighting of drilling locations.

The prior art has developed various seismic data processing software and methods seek to improve the signal-to-noise ratio throughout the source data volume. These methods can improve poor data zones, but typically at the expense of over-filtering of the good quality data zones. However, geologists require seismic data with optimum resolution.

Surface seismic data frequently suffers from a laterally variable signal-to-noise ratio from deep reflectors that is caused by near-surface features. The prior art is lacking in methods directed to processing seismic data for the restoration of lateral continuity to seismic signals which appear to be discontinuous in areas where geologic expectations would indicate that a more spatially consistent response should be obtained. These zones of poor quality data can be caused by a number of factors. For example, intermittent near-surface irregularities can cause scattering of down-going energy, which reduces returning signals to levels that can be equal to, or less than ambient noise levels.

Many of the prior art data processing programs attenuate noise to improve the relative signal levels, but in these areas complete restoration of the signal requires significant lateral filtering of the data which results in a loss of spatial resolution. Other prior art programs that are offered to increase signal levels have the same drawback of over-filtering good data zones, thereby resulting in a loss of spatial resolution. Typically, such prior art programs for post-stack noise attenuation do not comprehend changes in the signal-to-noise ratio.

The objective of the data processing methods of typical post-stack noise attenuation routines of the prior art is overall noise reduction. A variety of processes utilizing Karhunen-Loeve transforms for signal and noise seismic data processing have been disclosed in the prior art.

The article entitled *Application Of The Partial Karhunen-Loeve Transform To Suppress Random Noise in Seismic Sections* by Kamal Al-Yahya, *Geophysical Prospecting*, Vol. 39, pages 77-93 (1991) demonstrates the usefulness of the Karhunen-Loeve transform for reducing noise and thereby enhancing signals in seismic data. To make the procedure more efficient, time shifts were applied based on a range of linear moveout dip values in order to use only a partial Karhunen-Loeve transform (that is, one that uses a fewer number of principal components), thereby reducing computer time and memory requirements. By transforming a limited number of principal components that were assumed to contain signals, random noise levels were reduced in the process. A blocking strategy was also proposed to process the data part-by-part, by dividing the seismic section into blocks small enough for each block to be processed using relatively small matrices. The processed blocks are assembled to form the final filtered section.

Various methods describing the use of Karhunen-Loeve transforms for treating seismic data have been disclosed in the patent literature. For example, in U.S. Pat. No. 5,455,806, a multi-dimensional acoustic data processing and display system arranges acoustic data in a three-dimensional matrix. The three-dimensional matrix is compressed using singular value decomposition into singular vectors and singular values. A historical database is created and maintained and is also concatenated with the three-dimensional data. This database allows reverberation and noise to be diminished and other, weaker features in the data to be enhanced. Once the data is compressed, the data can be analyzed efficiently. The singular vectors are partitioned into one or more groups on the basis of their singular values or other criteria. Certain of the compressed data elements are enhanced or diminished by modifying the singular values within each of the groups of singular vectors. Selected singular vectors are processed further by other techniques for further enhancement, detection, isolation, feature extraction and classification. The compressed and enhanced data is then expanded back into three-dimensional form for display or for additional processing. This processing appears to directly transform the data rather than derive a model that is subsequently combined with the original input data. Singular value decomposition is a method available to perform KL transforms.

In U.S. Pat. No. 4,910,716, a method is disclosed to suppress coherent noise in seismic data based on the Karhunen-Loeve transform. This method selects a region containing undesired coherent noise. Eigenvectors determined from the co-variance matrix of that noise are used to reconstruct the noise throughout the data set. Subtracting the reconstruction from the original data leaves a residual in which the coherent noise has been suppressed. Applying this method to a shot record of marine seismic data illustrates that the procedure does suppress noise on actual seismic data. However, this model and its subtraction method seeks to model the noise, as opposed to the signal, and does not appear to take into account any signal dips on the input data or signal continuity on the transformed output data.

A trace weighting method is disclosed in U.S. Pat. No. 4,905,204 for developing a weight function for a trace stack from the weight functions derived from the respective weight functions of an ensemble of individual separate input traces. Also disclosed is a method for developing the resulting weighted trace stack, and a method of noise suppression utilizing weight function manipulation from a plurality of related seismic traces. While this disclosure discusses trace weighting and summing, it does not disclose the use of a KL transform to build a model trace. Nor does it suggest a preconditioning step with flattening statics based on input data dips.

In U.S. Pat. No. 5,892,732, a method and apparatus for the exploration of hydrocarbons is described comprising the steps of: obtaining a set of seismic signal traces distributed over a predetermined three-dimensional volume of the earth dividing the three-dimensional volume into a plurality of analysis cells having portions of at least two seismic traces located therein; computing outer products of the seismic traces within each cell; forming the covariance matrix for each cell from these outer products; computing the dominant eigenvalue and the sum of the eigenvalues of the covariance matrix of each cell and computing a seismic attribute from the ratio of the dominant eigenvalue to the sum of the eigenvalues of the covariance matrix of each cell; and forming map of the seismic attributes of selected groups of cells. This method apparently uses eigenvalue analysis to derive an attribute associated with traces in one position. It does not disclose or suggest the steps of signal reconstruction or modeling and subtraction.

Directly transforming the data from input to final output exposes limitations in the transform itself. These limitations manifest themselves as artifacts on the output data. Artifacts can be caused by limiting the number of principal components during the KL transform, especially for signals with non-linear dips. While directly transforming the data will serve to reduce noise, it does so at the expense of distorting the signal. This effect can be worsened in good data areas that do not require filtering to be useful.

It is therefore an object of the present invention to provide a seismic data processing method to overcome the adverse side effects of the over-filtering of strong signals by adapting the process to the data and applying the processing to the data only where needed.

Another object of the invention is to provide a method that is adaptable to process two-dimensional (2D) and three-dimensional (3D) input data.

A further object of the invention is to provide a method for noise attenuation that avoids a large amount of lateral mixing and does not degrade the resolution of good quality data.

Another object of the invention is to provide a method to laterally equalize the signal-to-noise ratio in a horizon-consistent manner.

SUMMARY OF THE INVENTION

The above objects and other advantages are obtained by the method of the invention which broadly comprehends the processing of the seismic data that requires the reconstruction of reflection signals exhibiting a poor signal-to-noise ratio. The method comprises preconditioning the input data for the target zones; computing a signal model; estimating trace signal continuity; applying special weighting to model traces; and outputting the final processed data.

A more detailed description of the subroutines employed in each of these data processing and analysis steps is provided below. The method of the invention reconstructs the signals only where needed by retaining the original detail of the input data and avoiding the unnecessary filtering of good quality data.

The method of the invention includes as a primary step a signal modeling based on the Karhunen-Loeve transform, followed by adaptive add-back processing as a second step. The Karhunen-Loeve ("KL") transform is used to form a co-variance matrix from the dot products of all pairs of input data. The eigenvalues and eigenvectors are then computed for this matrix. By the inverse transforming of only the strongest eigenvectors, an estimate of the noise-free signals, as opposed to random noise, is derived. For the purpose of describing the invention, these eigenvectors, when scaled by their eigenvalue, are referred to herein as "principal" components. The noise-free signal estimate is referred to at times in the following description of the invention as the "model" of the signal. These relatively coherent principal components are used as a model of the desired reconstructed signal.

The model add-back step is an adaptive process utilizing a combination of the input and signal model data from the first step to form the output. The contribution or add-back from the signal model is controlled by a continuity attribute found within the signal model. By minimizing the add-back step where the data is continuous, good quality signal-to-noise ratio data will be little changed by the process of the invention, and poor quality discontinuous data will benefit from an increased contribution of estimated coherent signal.

One significant advantage of using the method of the invention is a restored lateral balance to signal levels without the undesirable side effects that spatial filtering has on good quality data, such as lateral mixing. The practice of the method of the invention ultimately results in an improved signal-to-noise ratio in the seismic data. The method can utilize 2D and 3D input data.

As used herein, the term "good quality signal-to-noise ratio data" and "good quality data" means data that has been collected and processed to a relatively high signal-to-noise ratio, i.e., a relatively low noise level. These data would be characterized by relatively high values of continuity as computed from the model. Accordingly, the model contribution to the output data in these areas would be minimal.

The term "Principal Estimation and Reconstruction" and the acronym "PEAR" as used herein are to be understood to be a short-hand reference to the method of the invention. As used herein, the following terms have the meaning indicated: "digistack output" indicates the dip weight and sum method, and "FK power/blend output" means frequency-wave number exponentiation and sum method.

The adaptive add-back step of the process involves combining the input data with the model data to form the output. The contribution, or add-back, from the model is controlled by the determination of continuity found in the same model. By limiting add-back where data is continuous, good quality signal-to-noise ratio data will be little changed by the process; conversely, discontinuous data will benefit from an increased contribution of the signal estimate.

BRIEF DESCRIPTION OF THE DRAWINGS

The practice of the method of the invention and the beneficial improvements obtained will be further described with reference to the attached drawing sheets, where the time is recorded in seconds and the "input" displays appearing to the left are prepared using conventional prior art methods and the displays on the right side, and that are sometimes headed "PEAR", are obtained using the method of the invention, and in which:

FIG. 2 is a graphic display of a 2D seismic section of the prior art evidencing noise problems;

FIG. 3 is a zoomed display of 2D seismic data illustrating the application of the KL transform to the data of FIG. 2;

FIG. 4 is a display of 2D seismic data illustrating the KL transform of flattened input with computed scalars plotted on top;

FIG. 5 is a display of 2D seismic data illustrating the application of flattening statics to the input data, the model and the PEAR output data;

FIG. 6 is a display of 2D seismic data with flattening statics applied to the input and the PEAR output from the method of invention;

FIG. 7 is a display of the 2D seismic data of FIG. 2 illustrating a prior art method utilizing dip weighting and sum to form the final output;

FIG. 8 is a display of the previous 2D seismic data illustrating a prior art method utilizing frequency-wave number (FK) exponentiation to form the model, followed by summing with the input to form the final output display;

FIG. 9 is a comparison display of 2D seismic data comparing the resultant graphic displays using the method of the invention with the prior art methods of FIGS. 7 and 8;

FIG. 10 is a 3D seismic data example depicting a vertical section with illustrations comparing the input with the results of applying the method of invention to the input;

FIG. 11 is a 3D seismic data example depicting a horizontal time slice section comparing the input with the output obtained by the method of invention;

FIG. 12 is a second 3D seismic data example with a vertical section depicting the input data with control horizons in accordance with the prior art;

FIG. 13 is the second 3D seismic data example section comparing the input data with the resultant output display obtained by the method of invention;

5 FIG. 14 is a 3D zoomed vertical section comparing the conventional input with the output obtained by the method of invention;

FIG. 15 is a 3D horizontal view of a time slice at the 1400 millisecond level comparing the input with the output obtained by the method of invention;

FIG. 16 is a 3D horizontal view of a time slice at the 1800 millisecond level)comparing the input and output obtained by the method of invention;

FIG. 17 is a 3D zoomed horizontal view of the time slice of FIG. 16 comparing the input with the output obtained by the method of invention;

FIG. 18 is another 3D zoomed horizontal view of a time slice of FIG. 16 comparing the input with the output obtained by the method of invention;

FIG. 19 is a 3D horizontal view of a time slice at the 2000 millisecond level comparing the input with the output obtained by the method of invention;

FIG. 20 is a 3D horizontal view of a time slice at the 2800 millisecond level comparing the input with the output obtained by the method of invention; and FIG. 21 is a 3D zoomed horizontal view of the time slice of FIG. 20 comparing the input with the improved output obtained by the method of invention.

DESCRIPTION OF THE INVENTION

Figure 1:
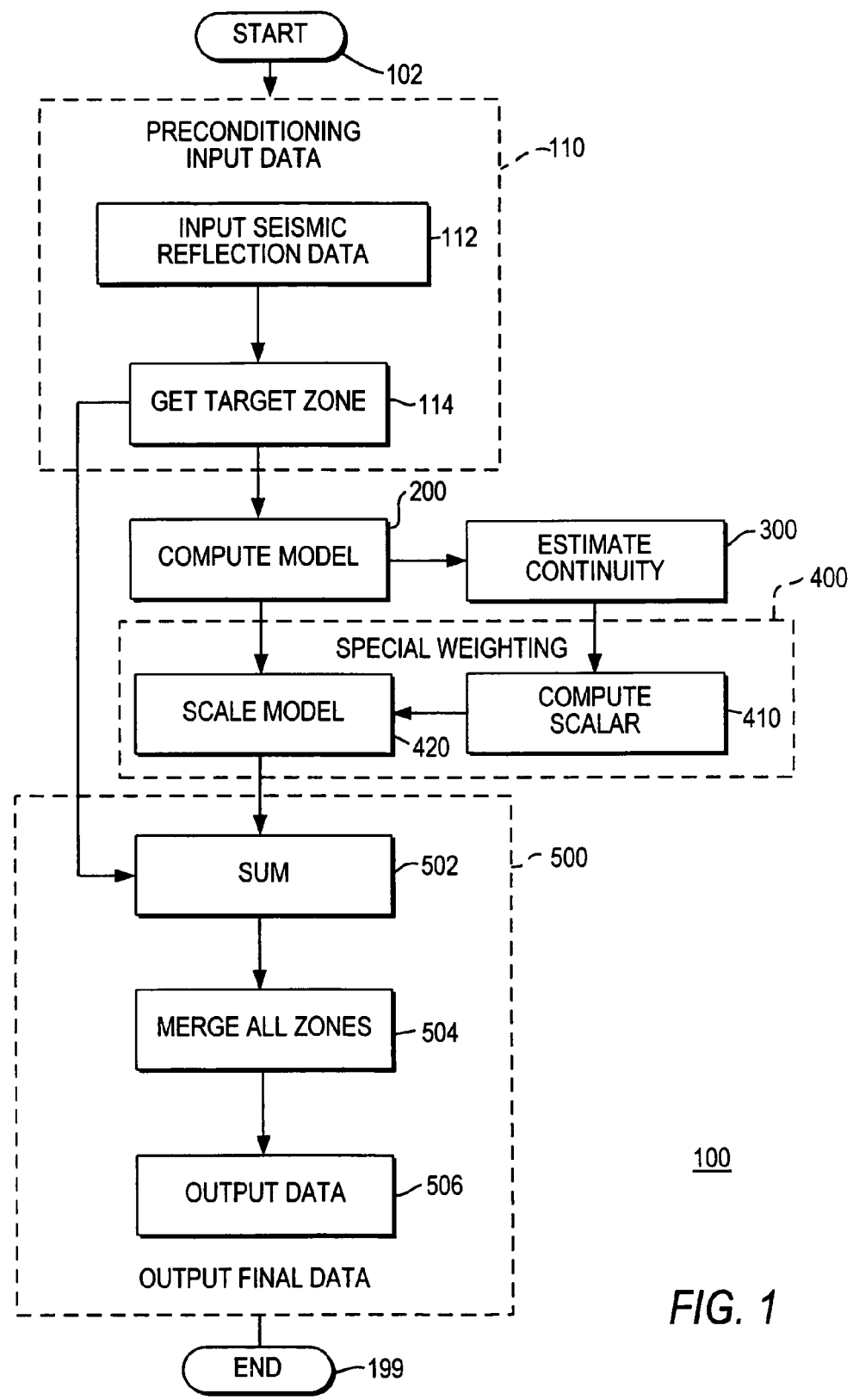
FIG. 1 is a flow diagram of the principal estimation and reconstruction (PEAR) method of the present invention.

At noted above, the principal estimation and reconstruction (PEAR) method of the present invention differs from typical methods for improving signal-to-noise ratio that focus on the reduction of noise levels because PEAR balances signal levels, which has the effect of improving the signal-to-noise ratio. To obtain this result, PEAR utilizes an estimate of the signal, even in poor data areas. This estimate is provided by further processing the input data using the Karhunen-Loeve transform of the input data.

The PEAR method is implemented as a series of steps with existing commercially available software programs and modules that are capable of being executed by computer systems conventionally known in the art. The work flow can be described as shown with respect to FIG. 1.

FIG. 1 is a flow diagram illustrating a principal estimation and reconstruction (PEAR) method 100 of the present invention. The method 100 comprises five principal steps including preconditioning input data for target zones 110, computing a signal model 200, Estimating trace signal continuity 300, spatial weighing of model traces 400, and outputting the final data 500.

The method 100 starts at 102, and proceeds to step 110, where preconditioning of the input data for target zones is performed. Preconditioning of the input data for target zones comprises starting with true amplitude input seismic reflection data 112, and obtaining a target zone 114. More specifically, the step 110 includes selecting geologic horizon of interest; storing times in a database; retrieving times from database; calculating flattening statics from times; applying flattening statics to input data; retaining a window of seismic data near flattened time and output; and displaying flattened data for quality control.

At step 200, a signal model is computed. As discussed below in greater detail, the signal model is computed by a) selecting time and space window segments; b) overlapping selected windows by 30 to 50 percent; c. performing a Karhunen-Loeve transform on each segment (for 3D data, transform inline and subline directions separately); d. estimating a coherent signal by outputting principal components e.g., first 4-8 principal components; e. merging signal model segments (for 3D data, merge inline and crossline estimates); f. outputting signal model data; and g. applying quality control to display of signal model data.

At step 300, trace signal continuity is estimated. Estimating trace signal continuity comprises a. cross-correlating neighboring traces in signal model; b. finding absolute maximum value of cross-correlation; c. storing maximum value in database as semblance; and d. applying quality control to display of semblance.

At step 400, spatial weighting of model traces is performed by computing trace scalars 410 and applying the scalars to the preconditioned signal model traces 420. In particular, the step 400 comprises a. adding small numerical value to semblance (e.g., 0.001); b. inverting semblance; c. optionally exponential scaling inverted semblance (exponent 1 or 2); d. optionally scaling resultant value (scalar 1 to 0.5); e. store as trace scalar in database; f. applying quality control to display of trace scalars; g. applying scalars to preconditioned signal model traces; and h. applying quality control to display of scaled signal model traces.

At step 500, output of final data is provided. At step 502, a summation is performed for the flattened input and model traces at common trace locations. Optionally, trace amplitude equalization is applied to the summed traces. Also, flattening statics are removed from the summed data. At step 504, output from other layers is merged. At step 506, the output of the final volume is generated, and customary quality control techniques are applied to display of final volume.

As will be apparent from the above step-wise description, signal reconstruction with the PEAR method differs from typical noise attenuation methods of the prior art where the objective is noise attenuation rather than signal reconstruction. The method of the invention also eliminates or significantly reduces filtering artifacts created by prior art noise attenuation methods, since the method operates only in poor data zones.

Another aspect of the method of the invention is the use of flattening statics on targeted horizons during the preconditioning step. This causes most of the target signal to be included in the strongest principal components of the KL transform, thereby providing a better estimate of signal, exclusive of noise.

Another significant feature of the present invention is the spatial weighting of the signal model data based on the inverse of an estimate of lateral continuity as given by the maximum absolute amplitude of the cross-correlation function between neighboring traces. This step applies further signal processing only where the data is discontinuous, that is, in zones of poor quality data. Good quality data zones are left relatively unaffected by the signal processing so that the overall effect is a restored lateral balance in the data. This step distinguishes the method of the invention from those programs or methods of the prior art that filter both poor and good quality data zones, the effect of which is to leave filter artifacts in the good data areas.

The method of the invention minimizes filtering artifacts by controlling how the transformed data is used in the output data. This control step is implemented in two ways: first, by selectively combining the coherent signal model with the input data to form the final output and, second, by preconditioning the input data with flattening statics derived from target horizon dips.

The method of the invention estimates weak or suppressed signals utilizing the KL transform in poor quality data zones, while avoiding filtering side effects in zones exhibiting good signals. The overall effect is the restoration of lateral balance to the signal without significantly modifying the good portions of the data. Thus, the data recovery from the poor zones are estimated and reconstructed, while the good data zones retain their original character and resolution.

Rather than apply the KL transform directly to the data to produce a final result, the method of the invention transforms the data into a model. The model is weighted and added back to the original input data to produce a final result. This method is in contrast with those prior art methods that simply filter the input data and directly output the final result.

The method of the invention is applied to stacked two-dimensional (2D) and three-dimensional (3D) seismic data. Stacks are formed by common depth point summation of individual seismic traces. Seismic traces are formed by the unique combination of one source and one receiver location in the field survey. The surface position of the common depth point is located mid-way between the source and receiver combination.

The memory requirements of the Karhunen-Loeve transform require the input data to be processed in ranges which are ultimately recombined to form the final signal model. The method can be run on several time windows of data, i.e., one for each horizon-oriented zone of interest. The very shallow and very deep portions of the data are also run separately and combined for output. Each time window is merged with neighboring time windows to form the final output.

For 3D data, the signal model is optionally generated by two executions of the KL transform. The first is oriented in the inline direction and the second is oriented in the cross line direction. Both estimates are summed to form the final signal model.

The method can also be applied to un-stacked seismic data. In this embodiment, the method is applied to common source, common receiver and common depth point, or common azimuth data ensembles.

Spectral scaling (also referred to as spectral equalization) can be optionally added after the PEAR process for a specific example or project. However, this additional step or processing of data is not part of the PEAR process of the invention With respect to the optional step 5(b) of applying trace amplitude equalization to the summed traces, it has been found in applying the method of the invention that anomalously low amplitude traces in the coherent signal model can cause large, outlier scalar values which can bias the amplitude of the summed trace. Applying a trace equalization (based on the RMS amplitude) is required. Should the processing guidelines prohibit the use of this scaling method, it can be removed so long as the customary quality control of scalar values includes an editing of any outlier values.

The method includes the use of parameters to control the model weighting prior to adding the model back to the original input data.

A further embodiment of the method includes the derivation of the signal model using a different method, e.g., with a trace mix or frequency wavenumber (FK) filter, followed by the same adaptive summation of model and input to produce the output data. As will be understood by those of ordinary skill in the art, FK filtering will generally produce a continuous version of the input data.

While one method such as FK filtering may produce a more continuous version, the KL transform better preserves the fine details of the input data, so that the final output displays of greater resolution than one using the filter method.

The method of the invention has been utilized successfully in both 2D and 3D seismic surveys for identifying production sites. In the following examples, graphic displays of one 2D survey and two different 3D surveys are presented.

Referring to FIG. 2, a graphic display of a 2D seismic section evidences the effect of noise problems. The data for this display has not been processed in accordance with the PEAR method of the invention. In view of the obvious deficiencies and difficulties in interpreting this display, attempts will be made in accordance with prior art practiced to improve the signal-to-noise ratio. The results of two example KL transforms of the input data is shown in FIG. 3 where the KL transform is applied to the input data appearing in the left column with two principal components appearing in the center column and five principal components displayed in the right column.

When the input seismic data of FIG. 3 is flattened on a target level and KL transformed data of FIG. 3 is flattened using the five principal components of FIG. 3, the results displayed in FIG. 4 are obtained. The upper portion of FIG. 5 also includes a graphic display of the computed scalars.

Referring now to FIG. 5, the results of applying the PEAR method of the invention is shown. As in the prior figures, the two dimensional seismic input data appears to the left; flattening statics have been applied to yield this display. The estimated signal model is presented in the center and the output of the PEAR process appears to the right. The improvement in continuity is quite apparent. FIG. 6 is a further example of the two-dimensional seismic data to which flattening statics have been applied, the input appearing at the top and the output following application of the PEAR processing method appearing at the bottom. The reference to "flattening" means that the data has been flattened and windowed on a target zone. Here again, the improvements in the quality of the graphic display is apparent.

In FIGS. 7 and 8, the application of the prior art methods of the dip weight and sum, and F-K exponentiation and sum are shown, respectively, in the lower graphic displays; the input data is shown in the upper display.

Referring now to FIG. 9, this final 2D comparisons depicts the resultant of the application of the PEAR method of the invention in the top display to the displays of FIGS. 6 (dip weight) and FIG. 7 (F-K exponentiation) at the bottom for the same section. Here again, the improvement in the continuity of the graphic display of the data resulting from the application of the method of the invention to the data is significantly greater than that obtained by either of the two prior art methods depicted.

FIGS. 10-21 provide comparative 3D seismic examples. The legends on the upper left margin refer to a numbering system used to spatial orient the seismic data. These references can include Common Depth Point (CDP), nearest surface source point (SHOT), cross-line number for 3D volumes (CDPLBLX), and in line numbers for 3D volumes (CDPLBLS). All of these reference numbers relate back to some physical location on the ground, which is ultimately referenced by a Cartesian (X, Y and Z) coordinates. In a typical 3D seismic volume, the third axis (z) is usually two way travel time. Thus, the reference to time is either in seconds or milliseconds throughout the FIGS. Horizontal time sections from 3D seismic volumes are profiles of the X and Y dimensions for a single two way travel time.

A first comparative 3D display is shown in FIG. 10 with the input stack of a vertical view at a cross line identified as "1667" on the left; the output after processing using the PEAR method is shown on the right. Again, the improvement in the continuity of the display using the method of the invention is apparent. Using data from the same test in FIG. 11, a 3D horizontal view of a time slice at 1800 milliseconds is compared with the input shown on the left and the improved graphic display following PEAR processing in accordance with the invention on the right.

Data from a second 3D seismic example is shown in FIG. 12. This is a vertical view at subline 3663; control horizons which define the target zones are plotted for reference purposes. Time is scaled in seconds. FIG. 13 presents a comparative display of the seismic data from FIG. 12 with the input data on the left and the PEAR processed output data displayed to the right. In a great majority of the instances, the poor quality data is presented with improved continuity while the good data zones retain their original character.

In FIG. 14, the zoomed vertical view is provided along the same subline 3663 as FIGS. 12 and 13, again with the input data display on the left and the much more complete and continuous data following PEAR processing to the right.

Additional 3D data from the second example is presented in the form of a horizontal view in a time slice of 1400 milliseconds and 1800 milliseconds in FIGS. 15 and 16, respectively. In both of these figures, the conventionally processed data appears to the left and the improved display following PEAR processing is presented on the right.

The same 3D data appears in FIGS. 17 and 18 as two different zoomed horizontal views at a time slice of 1800 milliseconds. In both instances, the right hand displays provide markedly better information following PEAR processing as compared to the conventional processing of the displays of the left hand views.

A similar series of 3D horizontal views from the second example are presented in FIGS. 19, 20 and 21 at time slices of 2000, 2800 and 2800 milliseconds, respectively. The time slices have been zoomed to further indicate the improved quality of the display of the data that has been subjected to PEAR processing in accordance with the invention on the right side as compared to conventional processing (left side).

As will be apparent to one of ordinary skill in the art the comparative results presented in FIGS. 2-21 from the method of the invention produces displays that are significantly improved in poor data zones while input data character is retained in good data zones as compared to those obtained by the prior art processing methods.

The method of the invention can be practiced with existing software programs and by assembling the required software modules and utilities from seismic data processing software libraries that are commercially available. One of the programs required is a module to track and flatten the data. A second module is utilized to KL-transform the flattened data. A third module adaptively adds the transformed data to the input data. Finally, a fourth module is employed to remove the flattening statics and output the final data.

Suitable seismic processing modules for use in the invention are available from commercial software suppliers. Modules included in the programs available from Paradigm Geophysical and marketed under the brand names Focus and Disco were found to be useful in the practice of the invention.

As will be apparent from the above description, the present invention comprehends an improved method of seismic data processing to reconstruct signal energy from input seismic data containing variable levels of signal and noise energy. The output data is obtained by a novel method of combining input data and modeled signal energy. One important benefit of the method is the restoration of lateral balance to signal levels without the undesired side effects, such as the lateral mixing of good data that are associated with the filtering processes of the prior art. The method results in a balanced signal-to-noise ratio across the seismic horizon of interest.

As will be apparent to one of ordinary skill in this art, the application of the PEAR process in the circumstance where there are extensive "no-data" zones, such as the case where the input data is composed of random numbers which, when processed by the PEAR method, will produce a result whose correctness can only be confirmed by end user interpretation and thus requires interpretative judgment. The exercise of such interpretive judgment is within the skill of the art and is routinely applied in other data analysis contexts.

I claim:

1. A method for reconstructing seismic data signals of poor quality to improve the signal-to-noise ratio of the data for display and geological analysis in connection with the selection of drilling sites for the recovery of hydrocarbons, the method comprising the steps:
   a. providing a signal model by applying a Karhunen-Loeve transform to selected input seismic data collected for the target zone to form a co-variance matrix from the dot products of all pairs of input data;
   b. computing the eigenvalues and eigenvectors for said matrix and inversely transforming the most significant eigenvectors to provide a coherent estimate of the noise-free signal to define said signal model;
   c. combining the input data with the signal model data based on a continuity attribute of said signal estimate data associated with a laterally variable signal-to-noise ratio from ground surface or near-ground surface irregularities, wherein combining the input data with the signal model is minimized where said signal model data is continuous and any discontinuous data is enhanced by a contribution of the signal estimate data; and
   d. displaying for analysis the reconstructed seismic data for the target zone.

2. The method of claim 1, which includes the further step of preconditioning said input data for the target zone prior to providing the signal model.

3. The method of claim 2, wherein the input data preconditioning includes supplying true amplitude input seismic reflection data for a selected geologic horizon to a first program module.

4. The method of claim 3, wherein the input data preconditioning includes calculating and applying flattening statistics to the input data for the selected geologic horizon.

5. The method of claim 4, wherein the input data preconditioning includes outputting the flattened seismic data to a second module for computation of a signal model.

6. The method of claim 5, wherein the input data preconditioning includes defining a plurality of time and space window segments and overlapping the defined window segments by at least 5% to 30%.

7. The method of claim 1, wherein the most significant eigenvectors are in a range of approximately the first 4 to 8 principal components of the transform.

8. The method of claim 6, wherein the application of the Karhunen-Loeve transform comprises performing a Karhunen-Loeve transform on each window segment.

9. The method of claim 1, wherein the provision of a signal model further comprises merging signal model segments and outputting the signal model data.

10. The method of claim 1, wherein said enhancement by a contribution of the signal estimate data comprises the steps of:
estimating signal continuity by cross-correlation of adjacent traces in the signal model; and
calculating the absolute maximum value in the cross-correlation function based on semblance and displaying the semblance.

11. The method of claim 10, further comprising:
spatially weighting the model traces by adding a numerical value to provide a non-zero semblance;
inverting the resulting increased semblance; and
storing the resultant as a trace scalar in a database.

12. The method of claim 11, further comprising:
displaying the trace scalars;
applying the scalars to weighted signal model traces; and
displaying the weighted signal model traces.

13. The method of claim 1, wherein said display for analysis of the reconstructed seismic data further comprises:
summing the flattened input and model traces at common trace locations;
subtracting the flattening statistics from the summed data; and
merging the data output from other layers in the target zone.

14. The method of claim 1, wherein said seismic data includes stacked 2-dimensional seismic data.

15. The method of claim 1, wherein said seismic data includes stacked 3-dimensional seismic data.

16. A method for reconstructing near-surface seismic data signals of poor quality for a predetermined geological volume to improve the signal-to-noise ratio of the data for display and analysis, the method comprising the steps of:
a. supplying true amplitude input seismic reflection data for a target zone volume to a first program module;
b. calculating and applying flattening statistics to the input data for a selected geologic horizon;
c. outputting the flattened seismic data to a second module for computation of a signal model;
d. defining a plurality of time and space window segments and overlapping the defined window segments by at least 5% to 30%;
e. performing a Karhunen-Loeve transform on each window segment;
f. outputting from 4 to 8 principal components of the tranform to provide an estimated signal model;
g. merging the signal model segments and outputting the signal model data;
h. estimating signal continuity by cross-correlation of adjacent traces in the signal model, and calculating the absolute maximum value in the cross-correlation function based as semblance and display semblance;
i. spatially weighting the model traces by adding a numerical value to provide a non-zero semblance, inverting the resulting increased semblance, and storing the resultant as a trace scalar in a database;
j. displaying the trace scalars, applying the scalars to the weighted signal model traces and displaying the weighted signal model traces;
k. summing the flattened input and model traces at common trace locations, subtracting the flattening statistics from the summed data, merging the data output from other layers in the target zone; and
l. displaying for analysis the reconstructed data for the volume.

17. The method of claim 16, that is performed on stacked 2-dimensional seismic data.

18. The method of claim 16, that is performed on stacked 3-dimensional seismic data.

19. The method of claim 18, wherein the performance of the Karhunen-Loeve transform on each window segment includes separately transforming inline and subline directions.

20. The method of claim 18, wherein the merging of signal model segments includes merging inline and crossline estimates.

21. A method for reconstructing seismic data signals of poor quality to improve the signal-to-noise ratio of the data for display and geological analysis in connection with the selection of drilling sites for the recovery of hydrocarbons, the method comprising the steps:
a. preconditioning input data for a target zone prior to providing a signal model, the input data preconditioning including supplying true amplitude input seismic reflection data for a selected geologic horizon to a first program module, calculating and applying flattening statistics to the input data for the selected geologic horizon, and outputting the flattened seismic data to a second module for computation of the signal model;
b. providing a signal model by applying a Karhunen-Loeve transform to selected input seismic data collected for the target zone to form a co-variance matrix from the dot products of all pairs of input data;
c. computing the eigenvalues and eigenvectors for said matrix and inversely transforming the most significant eigenvectors to provide a coherent estimate of the noise-free signal to define said signal model; and
d. combining the input data with the signal model data based on a determination that the model data lacks continuity, whereby the good quality signal-to-noise ratio data experiences little change and any discontinuous data is enhanced by a contribution of the signal estimate data;
e. displaying for analysis the reconstructed seismic data for the target zone.

22. The method of claim 21, wherein the input data preconditioning includes defining a plurality of time and space window segments and overlapping the defined window segments by at least 5% to 30%.

* * * * *